United States Patent
Bertz et al.

(10) Patent No.: US 12,335,847 B2
(45) Date of Patent: *Jun. 17, 2025

(54) USER EQUIPMENT (UE) CONTROL BY A NON-THIRD GENERATION PARTNERSHIP PROJECT (NON-3GPP) ACCESS NODE USING 3GPP SIGNALING

(71) Applicant: T-MOBILE INNOVATIONS LLC, Overland Park, KS (US)

(72) Inventors: Lyle T. Bertz, Lee's Summit, MO (US); Robert Keith Butler, Overland Park, KS (US); Marouane Balmakhtar, Fairfax, VA (US); Galip Murat Karabulut, Vienna, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 10 days.

This patent is subject to a terminal disclaimer.

(21) Appl. No.: 18/343,058

(22) Filed: Jun. 28, 2023

(65) Prior Publication Data

US 2023/0337116 A1    Oct. 19, 2023

Related U.S. Application Data

(63) Continuation of application No. 17/204,259, filed on Mar. 17, 2021, now Pat. No. 11,729,699.

(51) Int. Cl.
*H04W 4/00*      (2018.01)
*H04W 4/12*      (2009.01)
(Continued)

(52) U.S. Cl.
CPC ............. *H04W 48/08* (2013.01); *H04W 4/12* (2013.01); *H04W 4/90* (2018.02); *H04W 8/08* (2013.01);
(Continued)

(58) Field of Classification Search
CPC ....... H04W 48/08; H04W 48/16; H04W 8/08; H04W 76/25; H04W 4/90; H04W 4/12
(Continued)

(56) References Cited

U.S. PATENT DOCUMENTS 10,419,979 B2    9/2019 Youn et al.
10,674,469 B2    6/2020 Kim et al.
(Continued)

FOREIGN PATENT DOCUMENTS

EP       3713370 A1    9/2020
WO    2019018176 A1    1/2019
(Continued)

*Primary Examiner* — Temica M Beamer

(57) ABSTRACT

A wireless communication system transfers signaling messages between a wireless access node and a wireless user device. The wireless access node and the wireless user device wirelessly exchange user data with one another. The wireless communication system establishes a node signaling link with the wireless access node. The wireless communication system establishes a user signaling link with the wireless user device. The wireless communication system receives a signaling message from the wireless access node over the node signaling link and transfers the signaling message to the wireless user device over the user signaling link. The wireless communication system receives another signaling message from the wireless user device over the user signaling link and transfers the other signaling message to the wireless access node over the node signaling link.

20 Claims, 17 Drawing Sheets

(51) Int. Cl.
   *H04W 4/90*     (2018.01)
   *H04W 8/08*     (2009.01)
   *H04W 48/08*    (2009.01)
   *H04W 48/16*    (2009.01)
   *H04W 76/25*    (2018.01)
   *H04W 92/02*    (2009.01)

(52) U.S. Cl.
   CPC .......... *H04W 48/16* (2013.01); *H04W 76/25* (2018.02); *H04W 92/02* (2013.01)

(58) Field of Classification Search
   USPC ..................................................... 370/329
   See application file for complete search history.

(56) References Cited

U.S. PATENT DOCUMENTS

| | | |
|---|---|---|
| 10,764,951 B2 | 9/2020 | Park et al. |
| 10,779,254 B2 | 9/2020 | Lee et al. |
| 10,856,265 B2 | 12/2020 | Ryu |
| 2018/0262924 A1 | 9/2018 | Dao et al. |
| 2019/0007992 A1 | 1/2019 | Kim et al. |
| 2019/0021064 A1 | 1/2019 | Ryu et al. |
| 2019/0174449 A1 | 6/2019 | Shan et al. |
| 2020/0196375 A1 | 6/2020 | Ryu et al. |
| 2021/0076444 A1 | 3/2021 | Shu et al. |

FOREIGN PATENT DOCUMENTS

| | | |
|---|---|---|
| WO | 2020036466 A1 | 2/2020 |
| WO | 2020186092 A2 | 9/2020 |

USER EQUIPMENT (UE) CONTROL BY A NON-THIRD GENERATION PARTNERSHIP PROJECT (NON-3GPP) ACCESS NODE USING 3GPP SIGNALING

RELATED CASES

This United States Patent Application is a continuation of U.S. patent application Ser. No. 17/204,259 that was filed on Mar. 17, 2021 and is entitled "USER EQUIPMENT (UE) CONTROL BY A NON-THIRD GENERATION PARTNERSHIP PROJECT (NON-3GPP) ACCESS NODE USING 3GPP SIGNALING." U.S. patent application Ser. No. 17/204,259 is hereby incorporated by reference into this United States Patent Application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless access nodes are connected to the wireless network cores over backhaul data links.

Some of the wireless access nodes use Third Generation Partnership Project (3GPP) standards like 5GNR gNodeBs and LTE eNodeBs. 3GPP user devices wirelessly communicate with the 3GPP access nodes, and the 3GPP access nodes communicate with the 3GPP network cores. The 3GPP network cores feature 3GPP network elements like Access and Mobility Management Function (AMF), Session Management Function (SMF), User Plane Function (UPF), and non-3GPP Interworking Function (IWF). The 3GPP user devices and the 3GPP access nodes communicate over Radio Resource Control (RRC) links. The 3GPP access nodes communicate with the AMFs and UPFs in the 3GPP cores over N2 and N3 links. The 3GPP user devices and the 3GPP AMFs in the 3GPP cores communicate over N1 links that traverse the RRC and N2 links.

In the network cores, the non-3GPP IWFs communicate with the 3GPP AMFs over N2 links and with the 3GPP UPFs over N3 links. The non-3GPP IWFs also communicate with non-3GPP access nodes like Institute of Electrical and Electronic Engineers (IEEE) 802.11 (WIFI) nodes and IEEE 802.3 (ENET) nodes. The non-3GPP access nodes communicate with user devices over Y1 and NWu links that can be wireless or wireline. The non-3GPP access nodes communicate with the non-3GPP IWFs over Y2 and NWu links that can also be wireless or wireline. Some wireless user devices communicate with both non-3GPP access nodes and 3GPP access nodes. These wireless user devices also have redundant N1 links to the 3GPP AMFs over the NWu/N2 links and the RRC/N2 links. Thus, the 3GPP AMFs have dual N1 links to some user devices over 3GPP pathway and a non-3GPP pathway.

Although the non-3PP access nodes have Y1 links to the wireless user devices, the non-3GPP access nodes do not have RRC links or N1 links to the wireless user devices. The Y1 links do not support the functionality of the N1 and RRC links, and thus, the non-3GPP access nodes and their user devices have an ineffective signaling link. Moreover, the non-3GPP access nodes inefficiently throttle user device access during overloads.

Technical Overview

In some examples, a signaling message is transferred from a wireless access node to a wireless user device. The wireless access node and the wireless user device wirelessly exchange user data with one another. A node signaling link is established with the wireless access node. A user signaling link is established with the wireless user device. The signaling message is received from the wireless access node over the node signaling link. The signaling message is transferred to the wireless user device over the user signaling link.

In some examples, a signaling message is transferred from a wireless user device to a wireless access node. The wireless user device and the wireless access node wirelessly exchange user data with one another. A user signaling link is established with the wireless user device. A node signaling link is established with the wireless access node. The signaling message is received from the wireless user device over the user signaling link. The signaling message is transferred to the wireless access node over the node signaling link.

In some examples, a wireless communication system transfers signaling messages between an Institute of Electrical and Electronic Engineers (IEEE) 802.11 (WIFI) access node and User Equipment (UE). The wireless communication system comprises an Interworking Function (IWF) and an Access and Mobility Management Function (AMF). The IWF communicates with the WIFI access node and with the AMF. The AMF establishes an N1 signaling link with the UE over the IWF and the WIFI access node. The AMF receives a signaling message from the WIFI access node over the IWF. The AMF transfers the signaling message to the UE over the N1 signaling link. The AMF receives another signaling message from the UE over the N1 signaling link. The AMF transfers the other signaling message to the WIFI access node over the IWF.

DETAILED DESCRIPTION

Figure 1:
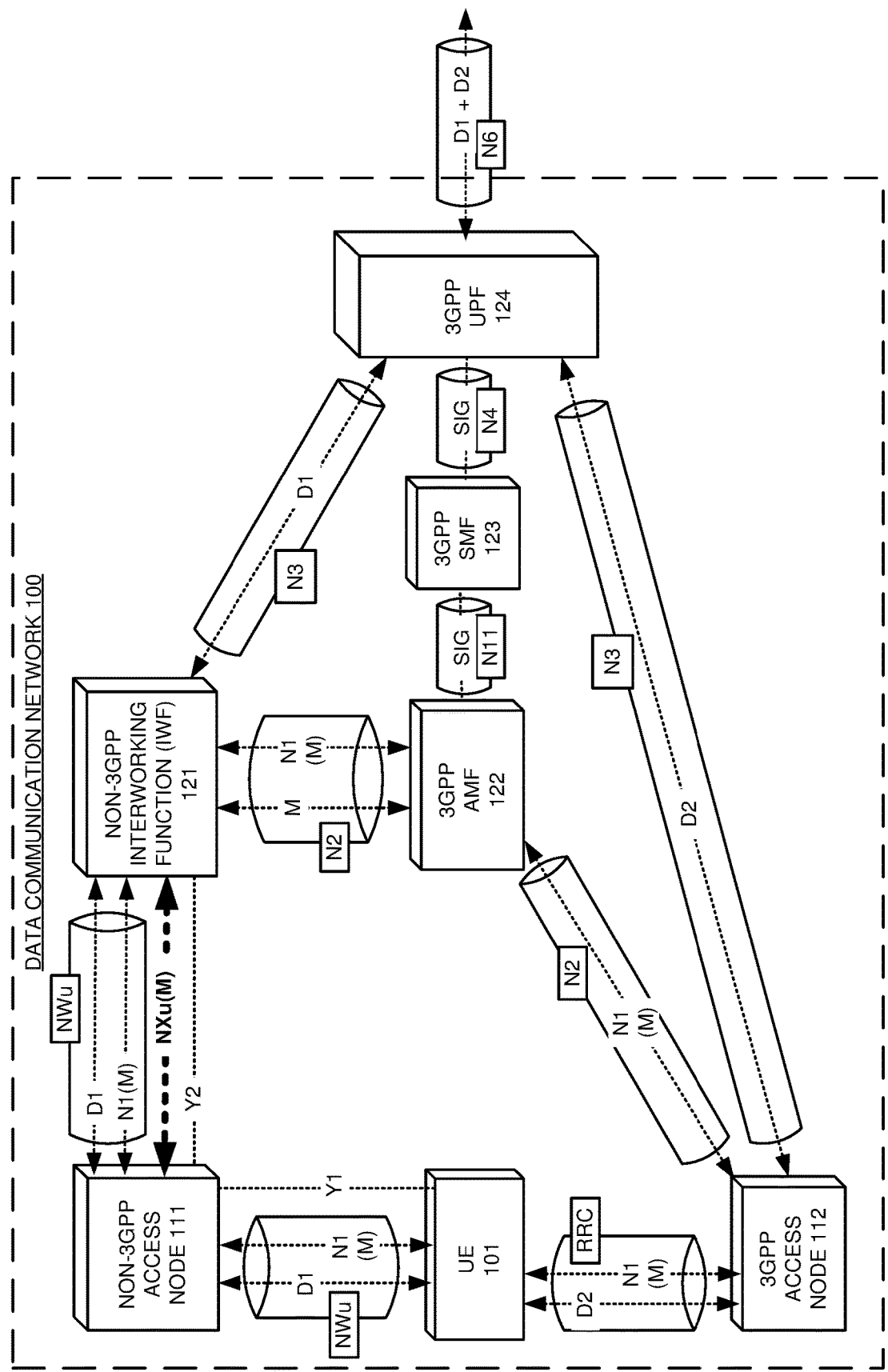
FIG. 1 illustrates a data communication network to control User Equipment (UE) over a non-Third Generation Partnership Project (non-3GPP) access node using 3GPP signaling.

FIG. 1 illustrates data communication network 100 to control User Equipment (UE) 101 over non-Third Generation Partnership Project (non-3GPP) access node 111 using 3GPP signaling. UE 101 comprises a computer, phone, vehicle, sensor, robot, or some other data appliance with wireless and/or wireline communication circuitry. Data communication network 100 delivers services to UE 101 like internet-access, machine communications, media-streaming, or some other data communications product. Data communication network 100 comprises UE 101, non-3GPP access node 111, 3GPP access node 112, non-3GPP Interworking Function (IWF) 121, 3GPP Access and Mobility Management Function (AMF) 122, 3GPP Session Management Function (SMF) 123, and 3GPP User Plane Function (UPF) 124. 3GPP access node 112 is not present in some examples.

Various examples of network operation and configuration are described herein. In some examples, non-3GPP access node 111 and non-3GPP IWF 121 communicate over a Y2 to establish an NXu. The NXu comprises a data link that supports secure data communications between non-3GPP access node 111 and non-3GPP IWF 121. The NXu could be similar to an NWu but terminate on non-3GPP access node 111 instead of UE 101.

UE 101 attaches to non-3GPP access node 111 over a Y1. UE 101 registers with non-3GPP IWF 121 over the Y1, non-3GPP access node 111, and Y2 to establish an NWu. UE 101 registers with 3GPP AMF 122 over the NWu and N2 that traverse non-3GPP access node 111 and non-3GPP IWF 121. UE 101 and 3GPP AMF 122 establish an N1 over the NWu and N2. 3GPP AMF 122 signals non-3GPP IWF 121 over the N2 to serve UE 101 over the NWu and an N3 between non-3GPP IWF 121 and 3GPP UPF 124. 3GPP AMF 122 signals 3GPP SMF 123 over an N11 to serve UE 101 over the N3 between non-3GPP IWF 121 and UPF 124. 3GPP SMF 123 signals 3GPP UPF 124 over an N4 to serve UE 101 over an N6 and over the N3 between non-3GPP IWF 121 and 3GPP UPF 124. 3GPP AMF 122 signals UE 101 over the N1 to communicate over a bearer that traverses the NWu, N3, and N6. UE 101 and non-3GPP IWF 121 exchange user data (D1) over the NWu that traverses non-3GPP access node 111. Non-3GPP IWF 121 and 3GPP UPF 124 exchange the user data (D1) over the N3. 3GPP UPF 124 exchanges the user data (D1) with external systems over the N6.

When 3GPP access node 112 is present and when UE 101 has wireless 3GPP capability, UE 101 wirelessly attaches to 3GPP access node 112 and establishes a Radio Resource Control (RRC) connection. UE 101 registers with 3GPP AMF 122 over the RRC, 3GPP access node 112, and an N2. UE 101 and 3GPP AMF 122 establish another N1 over the RRC and N2. 3GPP AMF 122 signals 3GPP access node 112 over the N2 to serve UE 101 over the RRC connection and over an N3 between 3GPP access node 112 and 3GPP UPF 124. 3GPP AMF 122 signals 3GPP SMF 123 over the N11 to serve UE 101 over the N3 between 3GPP access node 112 and 3GPP UPF 124. 3GPP SMF 123 signals 3GPP UPF 124 over the N4 to serve UE 101 over the N3 between 3GPP access node 112 and 3GPP UPF 124. 3GPP access node 112 signals UE 101 to communicate over a bearer that traverse the RRC, N3, and N6. UE 101 and 3GPP access node 112 exchange user data (D2) over the RRC. 3GPP access node 112 and 3GPP UPF 124 exchange the user data (D2) over the N3. 3GPP UPF 124 exchanges the user data (D2) with external systems over the N6.

Non-3GPP access node 111 identifies a UE message (M) for UE 101. The UE message (M) could indicate access control instructions, emergency information, internal node status, user content, or some other information for UE 101. For example, non-3GPP access node 111 may receive an overload warning from 3GPP AMF 122 and generate an access control message for UE 101 to mitigate the overload. Non-3GPP access node 111 transfers the UE message (M) for UE 101 to non-3GPP IWF 121 over the NXu. Non-3GPP IWF 121 transfers the UE message (M) for UE 101 to 3GPP AMF 122 over the N2. 3GPP AMF 122 transfers the UE message (M) to UE 101 over the N1 that traverses the N2 and NWu and/or the other N1 that traverses the N2 and RRC. UE 101 processes the UE message (M). For example, UE 101 may avoid using the bearer over the NWu/N3/N6 for a time period to mitigate an overload. Advantageously, non-3PP access node 111 and UE 101 have an effective signaling link over NXu/N2/N1 that supports 3GPP features. Moreover, non-3GPP access node 111 and UE 101 efficiently throttle UE access to mitigate network overloads.

UE 101 and non-3GPP access node 111 communicate over links using wireless technologies like Institute of Electrical and Electronic Engineers (IEEE) 802.11 (WIFI), IEEE 802.3 (ENET), Bluetooth, and/or some other non-3GPP protocol. UE 101 and 3GPP access node 112 wirelessly communicate over wireless links using wireless technologies like Fifth Generation New Radio (5GNR), Long Term Evolution (LTE), Low-Power Wide Area Network (LP-WAN), and/or some other 3GPP protocol. The wireless technologies use electromagnetic frequencies in the low-band, mid-band, high-band, or some other portion of the electromagnetic spectrum. The various links (RRC, Y1, Y2, NWu, NXu, N2, N3, N4, N6, N11) use metallic links, glass fibers, radio channels, or some other communication media. The links use IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, WIFI, Fifth Generation Core (5GC), virtual switching, inter-processor communication, bus interfaces, and/or some other data communication protocols. UE 101 and access nodes 111-112 comprise antennas, amplifiers, filters, modulation, analog/digital interfaces, microprocessors, software, memories, transceivers, bus circuitry, and the like. Network functions 121-124 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of data communication network 100 as described herein.

Figure 2:
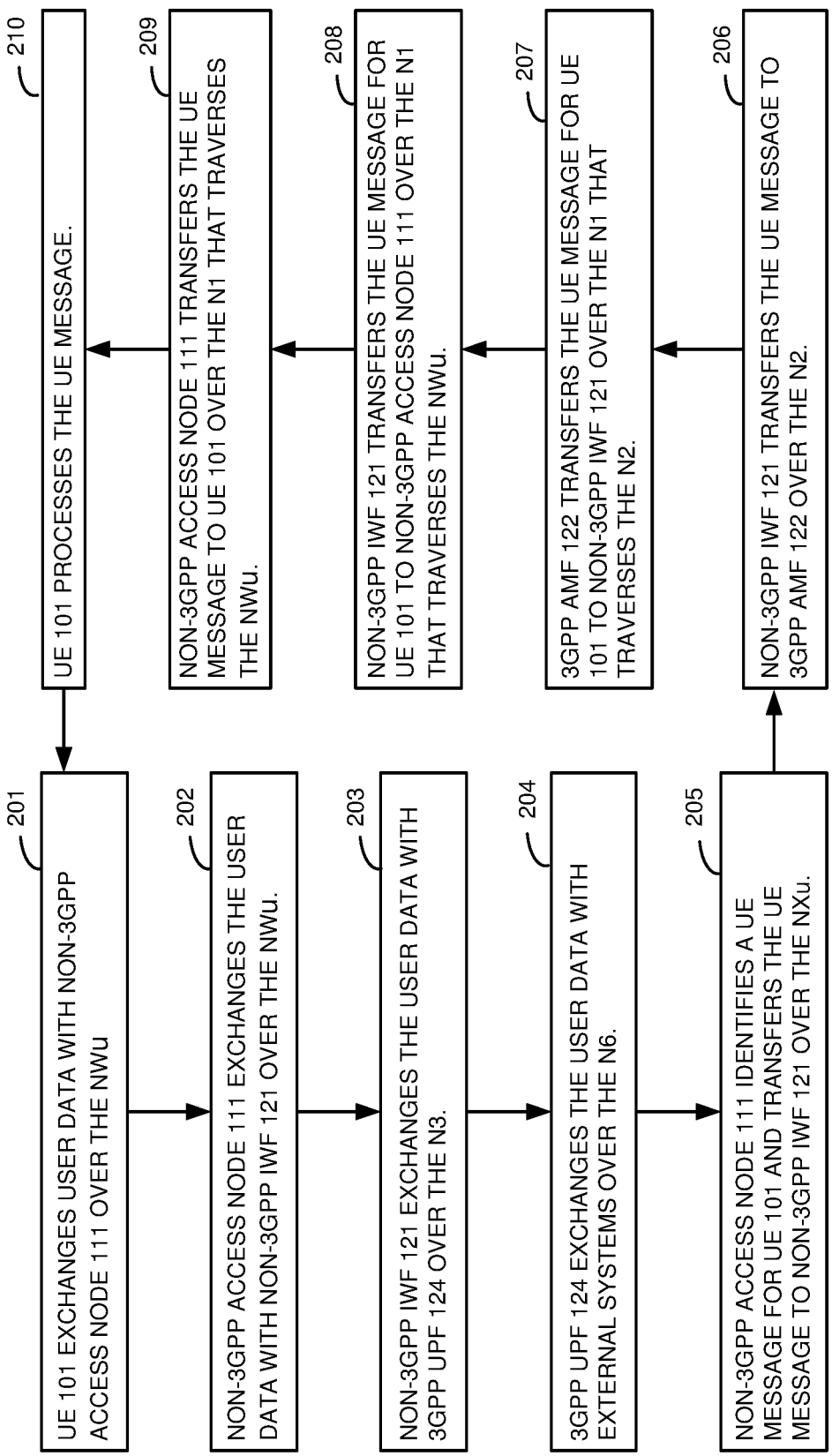
FIG. 2 illustrates an operation of the data communication network to control the UE over the non-3GPP access node using 3GPP signaling.

FIG. 2 illustrates an operation of data communication network 100 to control UE 101 over non-3GPP access node 111 using 3GPP signaling. The operation is exemplary and may vary in other examples. UE 101 exchanges user data with non-3GPP access node 111 over the NWu (201). Non-3GPP access node 111 exchanges the user data with non-3GPP IWF 121 over the NWu (202). Non-3GPP IWF 121 exchanges the user data with 3GPP UPF 124 over the N3 (203). 3GPP UPF 124 exchanges the user data with external systems over the N6 (204). Non-3GPP access node 111 identifies a UE message for UE 101 and transfers the UE message to non-3GPP IWF 121 over the NXu (205). Non-3GPP IWF 121 transfers the UE message to 3GPP AMF 122 over the N2 (206). 3GPP AMF 122 transfers the UE message for UE 101 to non-3GPP IWF 121 over the N1 that traverses the N2 (207). Non-3GPP IWF 121 transfers the UE message for UE 101 to non-3GPP access node 111 over the N1 that traverses the NWu (208). Non-3GPP access node 111 transfers the UE message to UE 101 over the N1 that traverses the NWu (209). UE 101 processes the UE message (210).

Figure 3:
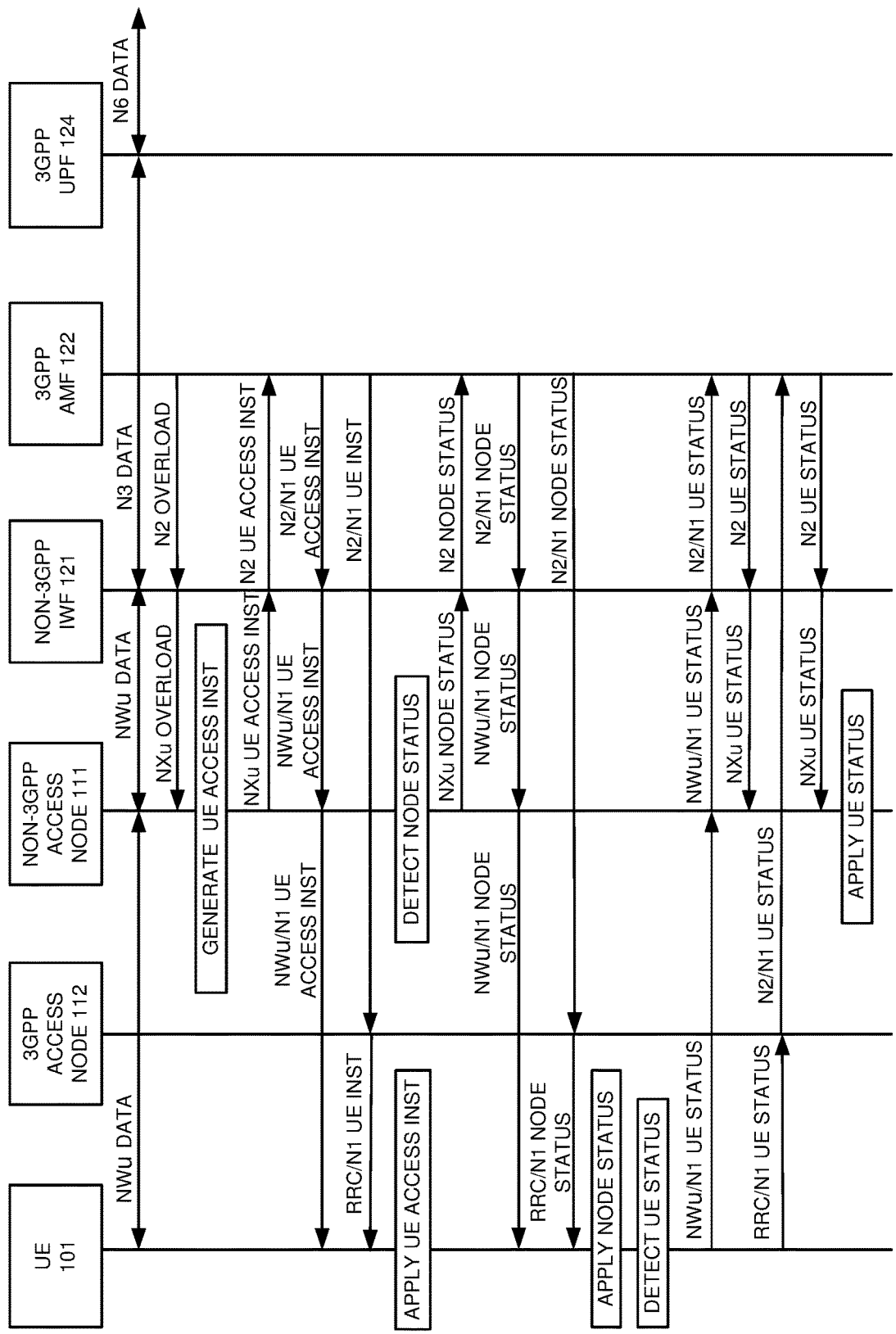
FIG. 3 illustrates another operation of the data communication network to control the UE over the non-3GPP access node using 3GPP signaling.

FIG. 3 illustrates another operation of data communication system 100 to control UE 101 over non-3GPP access node 111 using 3GPP signaling. The operation is exemplary and may vary in other examples. UE 101 and non-3GPP IWF 121 exchange data over the NWu that traverses non-3GPP access node 111. Non-3GPP IWF 121 and 3GPP UPF 124 exchange the data over the N3. 3GPP UPF 124 exchanges the user data with external systems over the N6.

3GPP AMF 122 detects an overload condition and indicates the overload condition to non-3GPP IWF 121 over the N2. Non-3GPP IWF 121 indicates the overload condition to non-3GPP access node 111 over the NXu. Non-3GPP access node 111 processes the overload condition and generates a UE access instruction (INST) for UE 101 to restrict usage of network 100 for a time-period. Non-3GPP access node 111 transfers the access instruction for UE 101 to non-3GPP IWF 121 over the NXu. Non-3GPP IWF 121 transfers the UE access instruction to 3GPP AMF 122 over the N2. 3GPP AMF 122 transfers the UE access instruction to UE 101 over the N1 that traverses the N2 and NWu that traverse non-3GPP IWF 121 and non-3GPP access node 111. When available, 3GPP AMF 122 may redundantly or alternatively transfer the access instruction to UE 101 over the other N1 that traverses the N2, 3GPP access node 112, and RRC. UE 101 applies the UE access instruction to mitigate the overload.

Non-3GPP access node 111 detects internal node status like a new service capability and generates corresponding node status information for UE 101. Non-3GPP access node 111 transfers the node status information to non-3GPP IWF 121 over the NXu. Non-3GPP IWF 121 transfers the node status information to 3GPP AMF 122 over the N2. 3GPP AMF 122 transfers the node status information to UE 101 over the N1 that traverses the N2 and NWu which traverse non-3GPP IWF 121 and non-3GPP access node 111. When available, 3GPP AMF 122 may redundantly or alternatively transfer the node status information to UE 101 over the other N1 that traverses the N2, 3GPP access node 112, and RRC. UE 101 applies the node status information. For example, UE 101 may request the new service capability from non-3GPP access node 111 over the reciprocal signaling path.

In a like manner, UE 101 detects internal UE status and generates UE status information for non-3GPP access node 111. For example, UE 101 may have a special service credit from another data system. UE 101 transfers corresponding UE status information to 3GPP AMF 122 over the N1 that traverses the NWu and N2 which traverse non-3GPP access node 111 and non-3GPP IWF 121. When available, UE 101 may redundantly transfer the UE status information to 3GPP AMF 122 over the other N1 that traverses the RRC, 3GPP access node 112, and N2. 3GPP AMF 122 transfers the UE status information to non-3GPP IWF 121 over the N2. Non-3GPP IWF 121 transfers the UE status information to non-3GPP access node 111 over the NXu. Non-3GPP access node 111 applies the UE status information. For example, non-3GPP access node 111 may apply the service credit from the UE status information to deliver the special service to UE 101 over the Y1.

Figure 4:
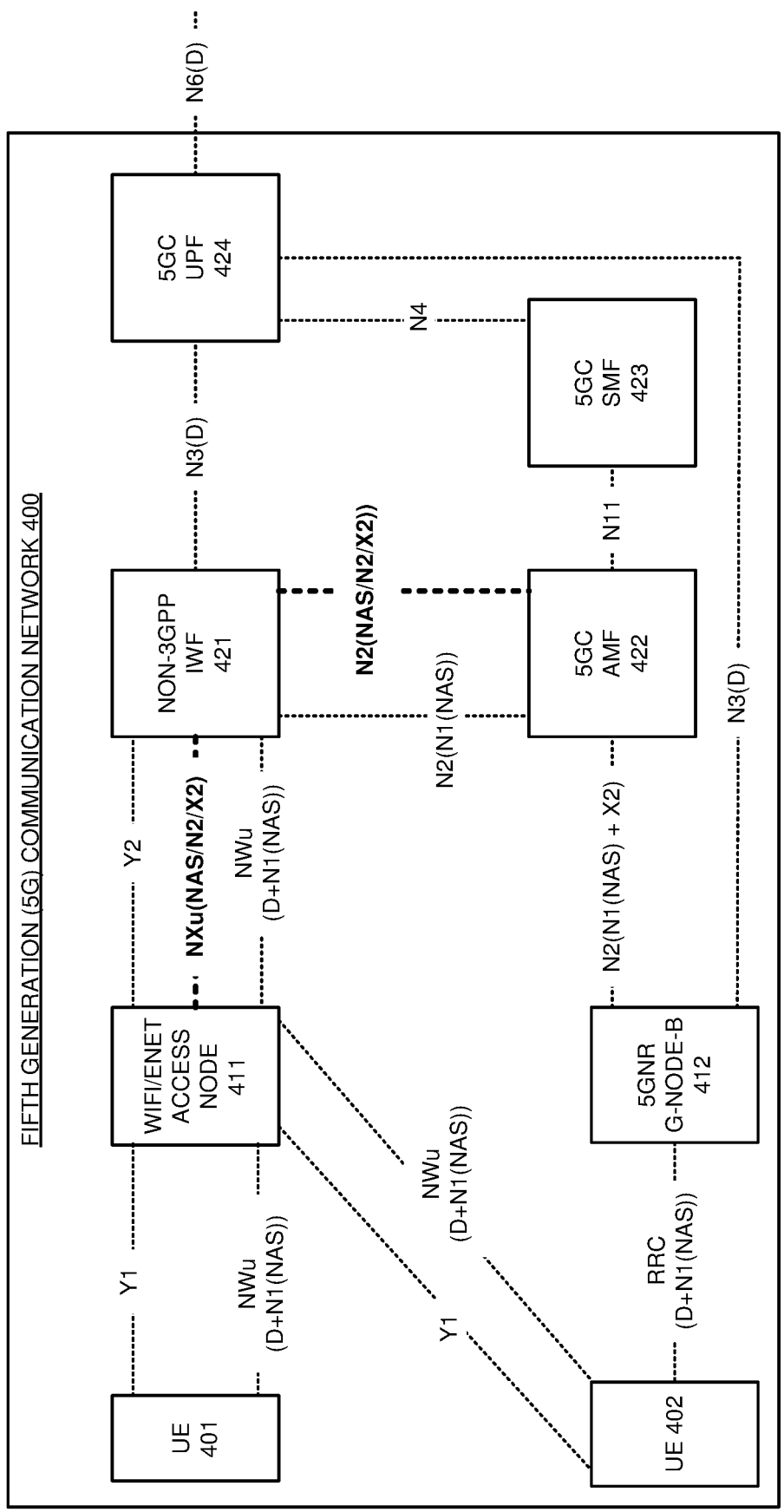
FIG. 4 illustrates a Fifth Generation (5G) communication network that comprises a non-3GPP Institute of Electrical and Electronic Engineers (IEEE) 802.11 and 802.3 (WIFI/ENET) access node that controls UEs using 3GPP signaling.

FIG. 4 illustrates Fifth Generation (5G) communication network 400 that comprises Institute of Electrical and Electronic Engineers (IEEE) 802.11 and 802.3 (WIFI/ENET) access node 411 that controls UEs 401-402 using 3GPP signaling. 5G communication network 400 comprises an example of data communication network 100, although network 100 may vary from this example. 5G communication network 400 comprises UEs 401-402, WIFI/ENET access node 411, 5GNR gNodeB 412, non-3GPP IWF 421, Fifth Generation Core (5GC) AMF 422, 5GC SMF 423, and 5GC UPF 424.

WIFI/ENET access node 411 and non-3GPP IWF 421 are linked by an NXu which is similar to an NWu— except that the NXu terminates on WIFI/ENET access node 411 instead of UE 401. WIFI/ENET access node 411 generates and consumes Non-Access Stratum (NAS) data, N2 data, and X2 data over the NXu. Non-3GPP IWF 421 interworks the NAS data, N2 data, and X2 data between the NXu and the N2 to 5GC AMF 422. 5GC AMF 422 interworks the NAS data between the NXu and N1. Thus, ENET/WIFI access node 411 and UEs 401-402 have individual NAS links over the NXu, N2, and N1 that traverse non-3GPP IWF 421 and 5GC AMF 422. 5GC AMF 422 forwards X2 data over N2. Thus, ENET/WIFI access node 411 and 5GNR gNodeB 422 have an X2 over the NXu and N2 that traverse non-3GPP IWF 421 and 5GC AMF 422. 5GC AMF 422 generates and consumes N2 data. Thus, ENET/WIFI access node 411 and 5GC AMF 422 have an N2 over the NXu and N2 that traverse non-3GPP IWF 421.

UE 401 attaches to WIFI/ENET access node 411 over a Y1. UE 401 registers with non-3GPP IWF 421 over the Y1/Y2 and establishes an NWu over WIFI/ENET access node 411. UE 401 registers with 5GC AMF 422 and establishes an N1 over the NWu and N2 that traverse WIFI/ENET access node 411 and non-3GPP IWF 421. 5GC AMF 422 signals non-3GPP IWF 421 over the N2 to serve UE 401 over the N3 between non-3GPP IWF 421 and 5GC UPF 424. 5GC AMF 422 signals 5GC SMF 423 over the N11 to serve UE 401 over the N3 between non-3GPP IWF 421 and 5GC UPF 424. 5GC SMF 423 signals 5GC UPF 424 over the N4 to serve UE 401 over the N6 and over the N3 between non-3GPP IWF 421 and 5GC UPF 424. 5GC AMF 422 signals UE 401 over the N1 to use the bearer over the NWu, N3, and N6 that traverses WIFI/ENET access node 411, non-3GPP IWF 421, and UPF 424. UE 401 and non-3GPP IWF 421 exchange the user data over the NWu that traverses WIFI/ENET access node 411. Non-3GPP IWF 421 and 5GC UPF 424 exchange the user data over the N3. 5GC UPF 424 exchanges the user data with external systems over the N6.

WIFI/ENET access node 411 identifies a UE message for UE 401. The UE message could be access control, emergency information, node status, user content, or some other information for UE 401. In some cases, 5GC AMF 422 detects an overload and transfers overload information to WIFI/ENET access node 411 over the N2 and NXu that traverse non-3GPP IWF 421. WIFI/ENET access node 411 processes the overload information to generate a UE access control message.

WIFI/ENET access node 411 transfers the UE access control message to non-3GPP IWF 421 over the NXu. Non-3GPP IWF 421 transfers the UE message to 5GC AMF 422 over the N2. 5GC AMF 422 transfers UE message to UE 401 over the N1 that traverses the N2 and NWu which traverse non-3GPP IWF 421 and WIFI/ENET access node 411. UE 401 processes the UE message. UE 401 may transfer messages to WIFI/ENET access node 411 over the reciprocal pathway.

UE 402 attaches to 5GNR gNodeB 412 and establishes a Radio Resource Control (RRC) connection. UE 402 registers with 5GC AMF 422 over the RRC, 5GNR gNodeB 412, and N2. UE 402 and 5GC AMF 422 establish an N1 over the RRC, 5GNR gNodeB 412, and N2. 5GC AMF 422 signals 5GNR gNodeB 412 over the N2 to serve UE 402 over an N3 between 5GNR gNodeB 412 and UPF 424. 5GC AMF 422 signals 5GC SMF 423 over the N11 to serve UE 402 over the N3 between 5GNR gNodeB 412 and 5GC UPF 424. 5GC SMF 423 signals 5GC UPF 424 over the N4 to serve UE 402 over the N3 between 5GNR gNodeB 412 and 5GC UPF 424. 5GNR gNodeB 412 signals UE 402 over the RRC to communicate over a bearer that traverses the RRC, 5GNR gNodeB 412, N3, UPF 424, and N6. UE 402 and 5GNR gNodeB 412 exchange user data over the RRC. 5GNR gNodeB 412 and 5GC UPF 424 exchange the user data over the N3. 5GC UPF 424 exchanges the user data with external systems over the N6.

UE 402 also attaches to WIFI/ENET access node 411 over a Y1. UE 402 registers with non-3GPP IWF 421 over the Y1/Y2 to establish an NWu over WIFI/ENET access node 411. UE 402 registers with 5GC AMF 422 over the NWu and N2 that traverse WIFI/ENET access node 411 and non-3GPP IWF 421. UE 402 and 5GC AMF 422 establish another N1 over the NWu and N2 that traverse WIFI/ENET access node 411 and non-3GPP IWF 421. 5GC AMF 422 signals non-3GPP IWF 421 over the N2 to serve UE 402 over the N3 between non-3GPP IWF 421 and 5GC UPF 424. 5GC AMF 422 signals 5GC SMF 423 over the N11 to serve UE 402 over the N3 between non-3GPP IWF 421 and 5GC UPF 424. 5GC SMF 423 signals 5GC UPF 424 over the N4 to serve UE 402 over the N6 and over the N3 between non-3GPP IWF 421 and 5GC UPF 424. 5GC AMF 422 signals UE 402 to communicate over the bearer that traverses the NWu, N3, and N6 which traverse non-3GPP IWF 421, non-3GPP IWF 421, and 5GC UPF 424. UE 402 and non-3GPP IWF 421 exchange the user data over the NWu which traverses WIFI/ENET access node 411. Non-3GPP IWF 421 and 5GC UPF 424 exchange the user data over the N3. 5GC UPF 424 exchanges the user data with external systems over the N6.

WIFI/ENET access node 411 identifies a UE message for UE 402. The UE message could be access control, emergency information, node status, user content, or some other information for UE 402. In some cases, 5GC AMF 422 detects an overload and transfers overload information to WIFI/ENET access node 411 over the N2 and NXu that traverse non-3GPP IWF 421. WIFI/ENET access node 411 processes the overload information to generate a UE access control message for UE 402. WIFI/ENET access node 411 transfers the UE access control message to non-3GPP IWF 421 over the NXu. Non-3GPP IWF 421 transfers the UE message to 5GC AMF 422 over the N2. 5GC AMF 422 may transfer the UE message to UE 402 over the N1 that traverses the N2 and NWu which traverse non-3GPP IWF 421 and WIFI/ENET access node 411. 5GC AMF 422 may also transfer the UE message to UE 402 over the other N1 that traverses the N2 and RRC which traverse 5GNR gNodeB 422. UE 402 processes the UE message. UE 402 may transfer messages to WIFI/ENET access node 411 over the reciprocal pathways.

Figure 5:
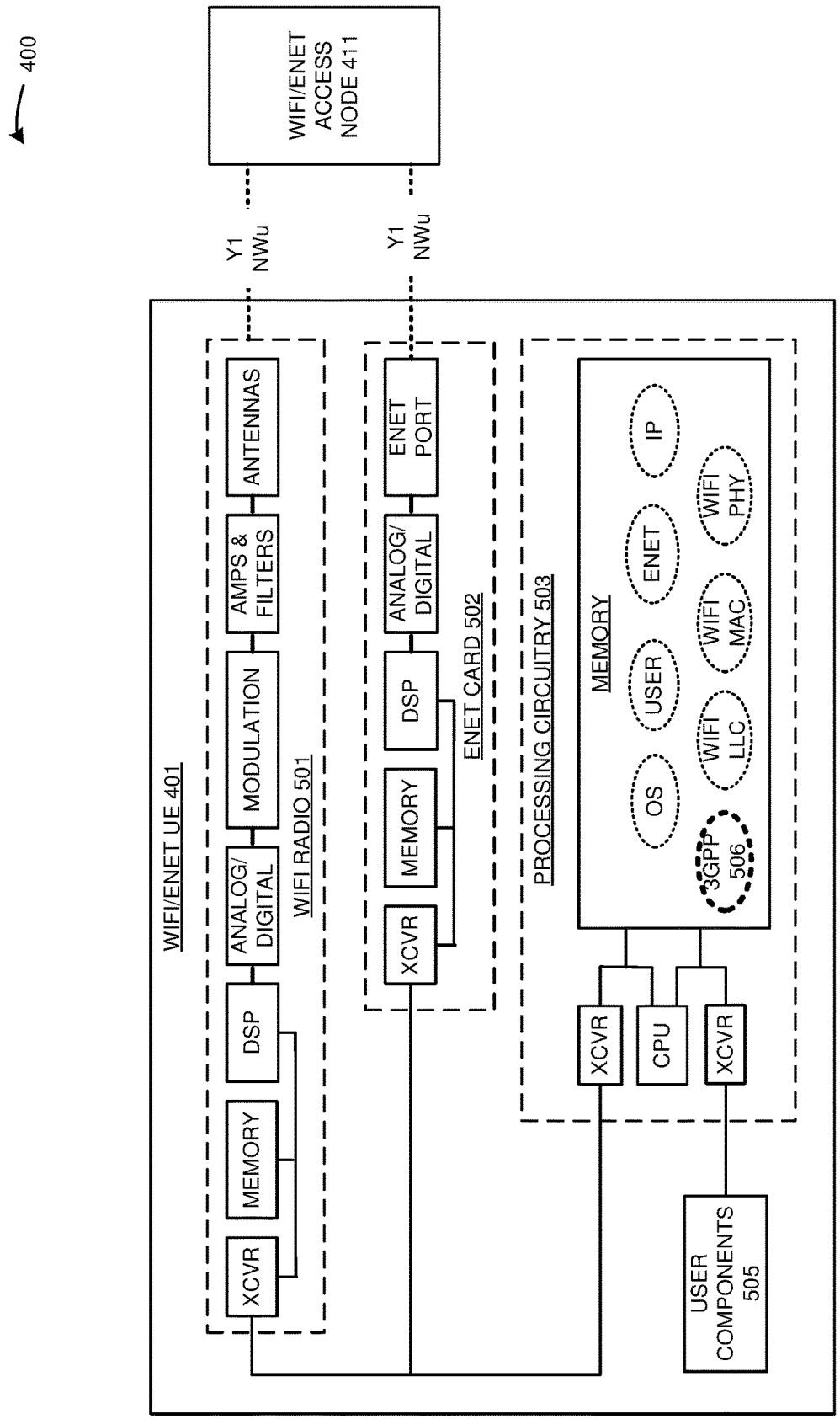
FIG. 5 illustrates a WIFI/ENET UE in the 5G communication network.

FIG. 5 illustrates WIFI/ENET UE 401 in 5G communication network 400. UE 401 comprises an example of UE 101, although UE 101 may differ from this example. UE 401 comprises WIFI radio 501, ENET card 502, and processing circuitry 503. WIFI radio 501 comprises antennas, amplifiers, filters, modulation, analog-to-digital interfaces, DSP, memory, and transceivers (XCVRs) that are coupled over bus circuitry. ENET card 502 comprises an ENET port, analog-to-digital interfaces, DSP, memory, and transceivers that are coupled over bus circuitry. Processing circuitry 503 comprises memory, CPU, user components, and transceivers that are coupled over bus circuitry. The memory in processing circuitry 503 stores an operating system (OS), user applications (USER), and network applications like ENET, Internet Protocol (IP), WIFI Physical Layer (PHY), WIFI Media Access Control (MAC), WIFI Logical Link Control (LLC), and 3GPP networking (3GPP) 506.

The antennas in WIFI radio 501 are wirelessly coupled to WIFI/ENET access node 411 over a wireless link that supports Y1 and NWu. The ENET port in ENET card 502 is wireline coupled to WIFI/ENET access node 411 over a metal and/or glass link that supports Y1 and NWu. Transceivers in 5GNR radio 501 and ENET card 502 are coupled to transceivers in processing circuitry 503. Transceivers in processing circuitry 503 are coupled to user components like displays, controllers, and memory. The CPU in processing circuitry 503 executes the operating system, user applications, and network applications to exchange WIFI data and ENET data with WIFI/ENET access node 411 over WIFI radio 501 and/or ENET card 502. In some examples, the WIFI portions of UE 401 are omitted and UE 401 is ENET only. In other examples, the ENET portions of UE 401 are omitted and UE 401 is WIFI only. UE 401 could also use other non-3GPP protocols like bluetooth and narrowband internet-of-things in combination or stand-alone.

The WIFI network applications in UE 401 attach to WIFI/ENET access node 411 over WIFI radio 501 and Y1. The ENET network applications in UE 401 attach to WIFI/ENET access node 411 over ENET card 502 and Y1. 3GPP 506 registers with non-3GPP IWF 421 over the Y1/Y2 and WIFI/ENET access node 411 to establish an NWu that traverses WIFI/ENET access node 411. 3GPP 506 registers with 5GC AMF 422 to establish an N1 over the NWu and N2 that traverse WIFI/ENET access node 411 and non-3GPP IWF 421. The NWu carries N1 which transports NAS.

The WIFI network applications in UE 401 and WIFI/ENET access node 411 exchange user data over the NWu that traverses WIFI radio 501. The ENET network applications in UE 401 and WIFI/ENET access node 411 exchange user data over the NWu that traverses ENET card 502. 3GPP 506 and 5GC AMF 422 exchange NAS over the N1 that traverses the NWu and N2 which traverse WIFI/ENET access node 411 and non-3GPP IWF 421. 3GPP 506 and WIFI/ENET access node 411 exchange NAS over the NXu and N1—where the N1 traverses the N2 and NWu which traverse non-3GPP IWF 421 and WIFI/ENET access node 411. 3GPP 506 in UE 401 processes the NAS.

Figure 6:
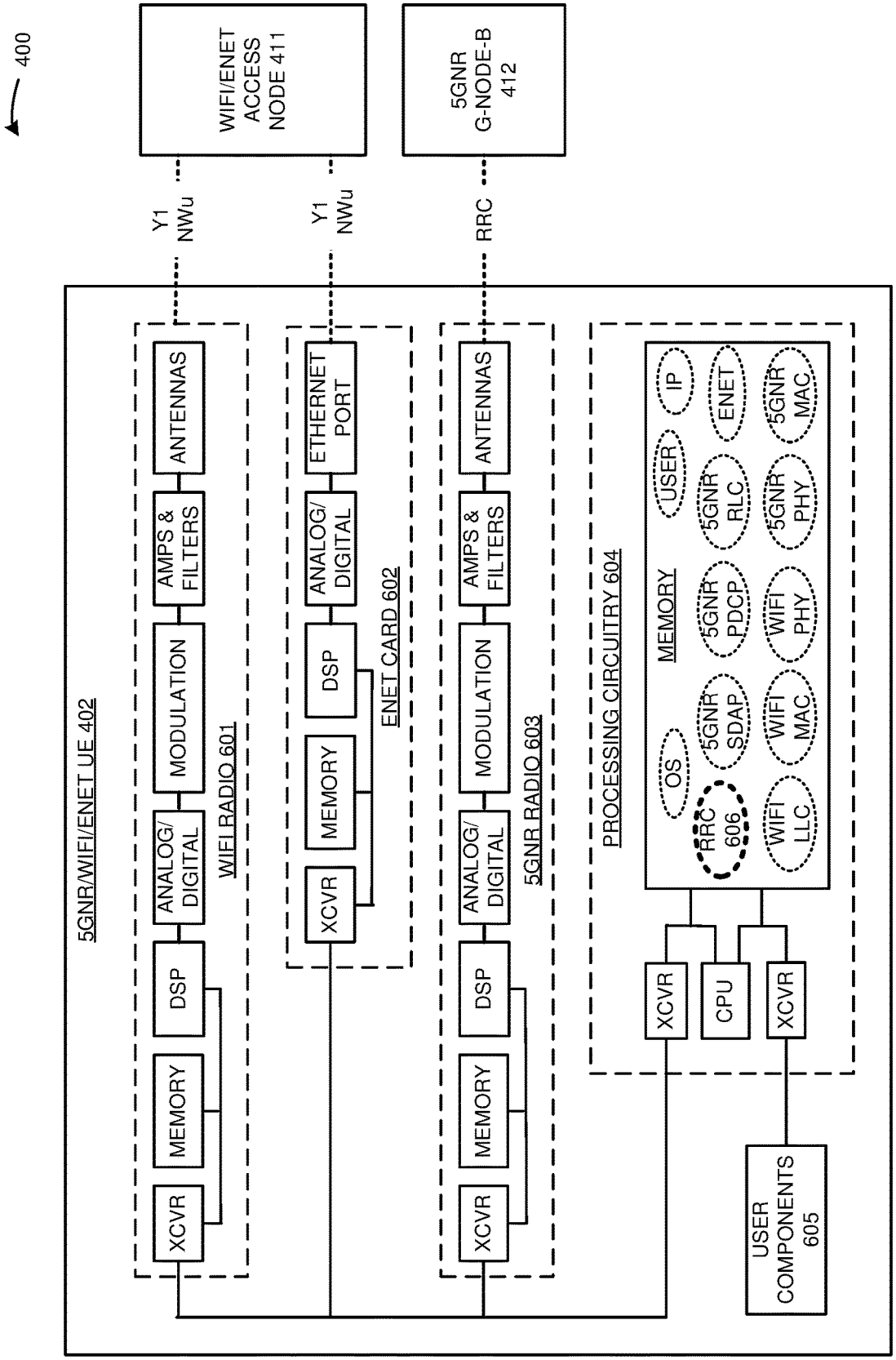
FIG. 6 illustrates a 5GNR/WIFI/ENET UE in the 5G communication network.

FIG. 6 illustrates 5GNR/WIFI/ENET UE 402 in 5G communication network 400. UE 402 comprises an example of UE 101, although UE 101 may differ from this example. UE 402 comprises WIFI radio 601, ENET card 602, 5GNR radio 603, and processing circuitry 604. WIFI radio 601 and 5GNR radio 603 comprise antennas, amplifiers, filters, modulation, analog-to-digital interfaces, DSP, memory, and transceivers that are coupled over bus circuitry. ENET card 602 comprises an ENET port, analog-to-digital interfaces, DSP, memory, and transceivers that are coupled over bus circuitry. Processing circuitry 604 comprises memory, CPU, user interfaces and components, and transceivers that are coupled over bus circuitry. The memory in processing circuitry 604 stores an operating system, user applications, and network applications like IP, ENET, 5GNR PHY, 5GNR MAC, 5GNR Radio Link Control (RLC), 5GNR Packet Data Convergence Protocol (PDCP), 5GNR Service Data Adaptation Protocol (SDAP), and Radio Resource Configuration (RRC) 606.

The antennas in WIFI radio 601 are wirelessly coupled to WIFI/ENET access node 411 over a wireless link that supports Y1 and NWu. The ENET port in ENET card 602 is wireline coupled to WIFI/ENET access node 411 over a metal and/or glass link that supports Y1 and NWu. The antennas in 5GNR radio 603 are wirelessly coupled to 5GNR gNodeB 412 over a wireless link that supports RRC. Transceivers in WIFI radio 601, ENET card 602, and 5GNR radio 603 are coupled to transceivers in processing circuitry 604. Transceivers in processing circuitry 604 are coupled to user components 605 like displays, controllers, and memory. The CPU in processing circuitry 604 executes the operating system, user applications, and 5GNR network applications to exchange 5GNR signaling and data with 5GNR gNodeB 412 over 5GNR radio 603. The CPU in processing circuitry 604 executes the operating system, user applications, and WIFI/ENET network applications to exchange WIFI data and ENET data with WIFI/ENET access node 411 over WIFI radio 601 and/or ENET card 602.

RRC 606 in UE 402 attaches to 5GNR gNodeB 412 and establishes the RRC. RRC 606 in UE 402 registers with 5GC AMF 422 over the RRC, 5GNR gNodeB 412, and N2. The 5GNR RRC in UE 402 and 5GC AMF 422 establish an N1 over the RRC, 5GNR gNodeB 412, and N2. The 5GNR network applications in UE 402 and 5GNR gNodeB 412 exchange user data over 5GNR radio 603. In some examples, the WIFI portions of UE 402 are omitted and UE 402 is ENET/5GNR only. In other examples, the ENET portions of UE 402 are omitted and UE 402 is WIFI/5GNR only. UE 402 could also use other non-3GPP protocols like bluetooth and narrowband internet-of-things.

The WIFI network applications in UE 402 attach to WIFI/ENET access node 411 over WIFI radio 601 and Y1. The ENET network applications in UE 402 attach to WIFI/ENET access node 411 over ENET card 602 and Y1. RRC 606 registers with non-3GPP IWF 421 and establishes an NWu over WIFI/ENET access node 411. RRC 606 registers with 5GC AMF 422 and establishes an N1 over the NWu and N2 that traverse WIFI/ENET access node 411 and non-3GPP IWF 421. The NWu carries N1 which transports NAS. The WIFI network applications in UE 402 and WIFI/ENET access node 411 exchange user data over the NWu that traverses WIFI radio 601. The ENET network applications in UE 402 and WIFI/ENET access node 411 exchange user data over the NWu that traverses ENET card 602.

RRC 606 and 5GC AMF 422 exchange NAS over the N1 that traverses 5GNR gNodeB 412 and N2. RRC 606 and 5GC AMF 422 exchange NAS over the N1 that traverses the NWu and N2 which traverse WIFI/ENET access node 411 and non-3GPP IWF 421. RRC 606 and WIFI/ENET access node 411 exchange NAS over the NXu and N1— where the N1 traverses NWu and N2 which traverse WIFI/ENET access node 411 and non-3GPP IWF 421. 3GPP 506 in UE 401 processes the NAS.

Figure 7:
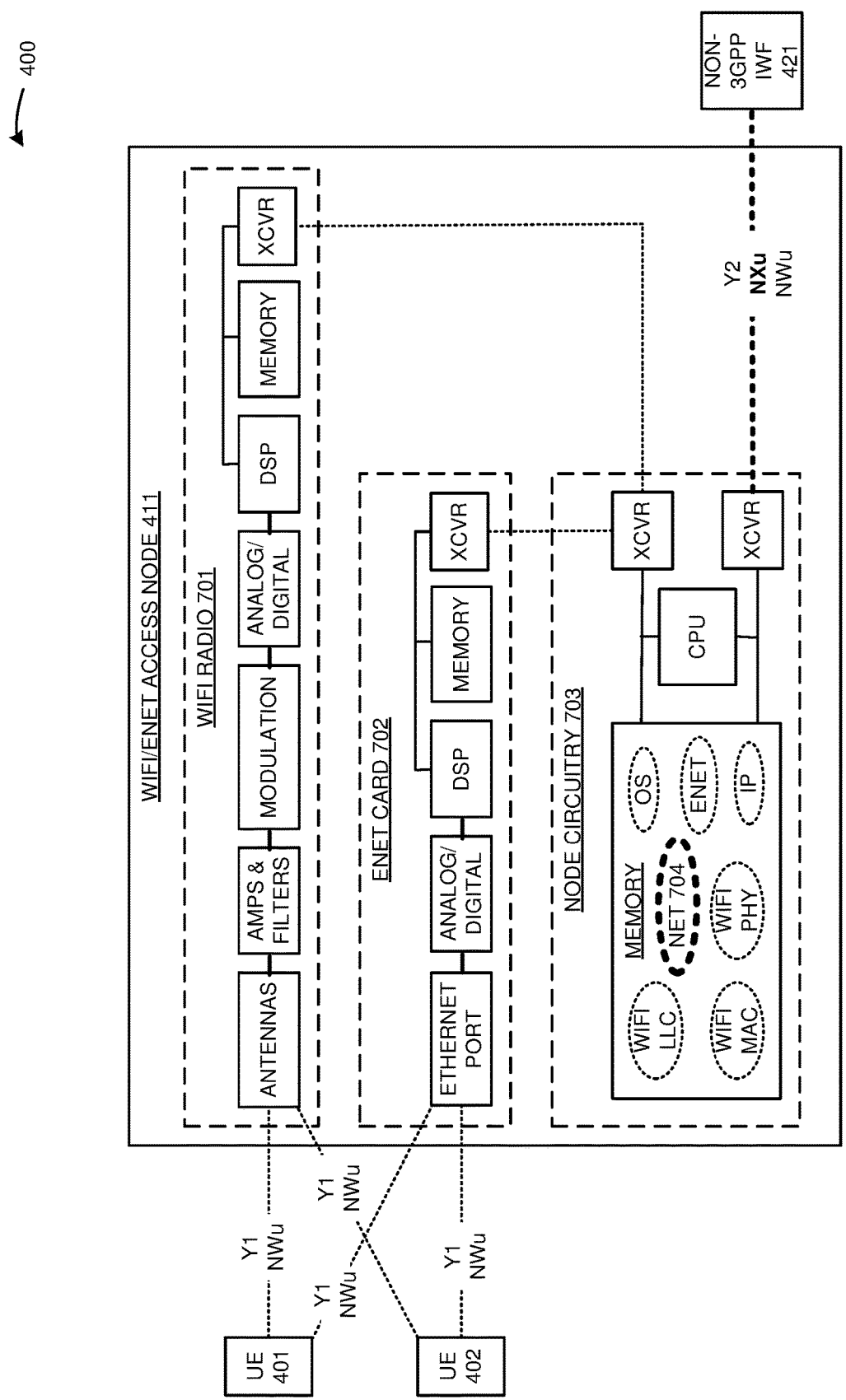
FIG. 7 illustrates the WIFI/ENET access node in the 5G communication network.

FIG. 7 illustrates WIFI/ENET access node 411 in 5G communication network 400. WIFI/ENET access node 411 comprises an example of non-3GPP access node 111, although non-3GPP access node 111 may differ from this example. WIFI/ENET access node 411 comprises WIFI radio 701, ENET card 702, and node circuitry 703. WIFI radio 701 comprises antennas, amplifiers, filters, modulation, analog-to-digital interfaces, DSP, memory, and transceivers that are coupled over bus circuitry. ENET card 702 comprises ENET ports, analog-to-digital interfaces, DSP, memory, and transceivers that are coupled over bus circuitry. Node circuitry 703 comprises memory, CPU, and transceivers that are coupled over bus circuitry. The memory in node circuitry 703 stores operating systems and network applications like WIFI PHY, WIFI MAC, WIFI LLC, ENET, IP, and 3GPP Networking (NET) 704.

The antennas in WIFI radio 701 are wirelessly coupled to UEs 401-402 over wireless links that support Y1 and NWu. The ENET port in ENET card 702 is wireline coupled to UEs 401-402 over metal and/or glass links that support Y1 and NWu. Transceivers in WIFI radio 701 and ENET card 702 are coupled to transceivers in node circuitry 703. Transceivers in node circuitry 703 are coupled to transceivers in non-3GPP IWF 421 over backhaul links. NET 704 attaches to non-3GPP IWF 421 over Y2 and establishes an NXu. The NXu is similar to the NWu and may use Internet Protocol (IP), Internet Key Exchange (IKE), and Extensible Authentication Protocol (EAP). The CPU in node circuitry 703 executes the operating system and network applications to exchange data and signaling with UEs 401-402 over the Y1 and NWu and to exchange data and signaling with non-3GPP IWF 421 over the Y2, NXu, and NWu.

In some examples, WIFI radio 701 and the WIFI network applications are omitted, and ENET card 702 and the ENET applications are used as described. In other examples, ENET card 702 and the ENET applications are omitted, and WIFI radio 701 and the WIFI network applications are used as described. Other wireless protocols like bluetooth and narrowband internet-of-things could be used in addition to or instead of WIFI and ENET.

UE 401 attaches to the WIFI network applications in node circuitry 703 over WIFI radio 701 and Y1. UE 401 registers with non-3GPP IWF 421 over the Y1, WIFI radio 701, NET 704, and Y2. UE 401 and non-3GPP IWF 421 establish their NWu over WIFI radio 701 and NET 704. UE 401 registers with 5GC AMF 422 over the over the NWu and N2 that traverse WIFI radio 701, NET 704, and non-3GPP IWF 421. UE 401 and 5GC AMF 422 establish an N1 over the NWu and N2 that traverse WIFI radio 701, NET 704, and non-3GPP IWF 421. UE 401 and non-3GPP IWF 421 exchange user data over the NWu that traverses WIFI radio 701 and NET 704.

In some examples, UE 401 attaches to the ENET network applications in node circuitry 703 over ENET card 702 and Y1. UE 401 registers with non-3GPP IWF 421 over the Y1, ENET card 702, NET 704, and Y2. UE 401 and non-3GPP IWF 421 establish their NWu over ENET card 702 and NET 704. UE 401 registers with 5GC AMF 422 over the over the NWu and N2 that traverse ENET card 701, NET 704, and non-3GPP IWF 421. UE 401 and 5GC AMF 422 establish an N1 over the NWu and N2 that traverses ENET card 702, NET 704, and non-3GPP IWF 421. UE 401 and non-3GPP IWF 421 exchange user data over the NWu that traverses ENET card 702 and NET 704.

In node circuitry 703, NET 704 identifies a UE message for UE 401. The UE message could be access control, emergency information, node status, user content, or some other information for UE 401. In some cases, 5GC AMF 422 detects a condition and transfers N2 signaling with the condition information to NET 704 over the NXu and N2. NET 704 processes the condition information to generate the UE message. NET 704 transfers the UE message to non-3GPP IWF 421 over the NXu which forwards the UE message to 5GC AMF 422 over the N2. 5GC AMF 422 transfers the UE message to UE 401 over the N1 that traverses the N2 and NWu which traverse IWF 421, NET 704, and radio 701 or card 702. UE 401 may transfer messages to NET 704 over the reciprocal pathway.

WIFI/ENET access node 411 performs similar operations for UE 402 as described above for UE 401. UE 402 communicates with 5GNR gNodeB 412 over 5GNR RRC. UE 402 communicates with 5GC AMF 422 over the N1 that traverses the RRC, 5GNR gNodeB 412, and N2. 5GC AMF 422 may exchange UE messages between UE 402 and WIFI/ENET access node 411 over the N1 that traverses WIFI/ENET access 411 and/or the N1 that traverses 5GNR gNodeB 412.

In some examples, NET 704 generates N2 data for 5GC AMF 422. The N2 data comprises node status, handover information, UE data, and the like. NET 704 transfers its N2 data to non-3GPP IWF 421 over the NXu. Non-3GPP IWF 421 transfers the N2 data to 5GC AMF 422 over N2. In some examples, NET 704 generates X2 data for 5GNR gNodeB 412. The X2 data comprises node status, handover information, UE data, and the like. NET 704 transfers its X2 data to non-3GPP IWF 421 over the NXu. Non-3GPP IWF 421 transfers the X2 data to 5GC AMF 422 over N2. AMF 422 transfers the X2 data to RRC 804 in 5GNR gNodeB 412 over N2.

Figure 8:
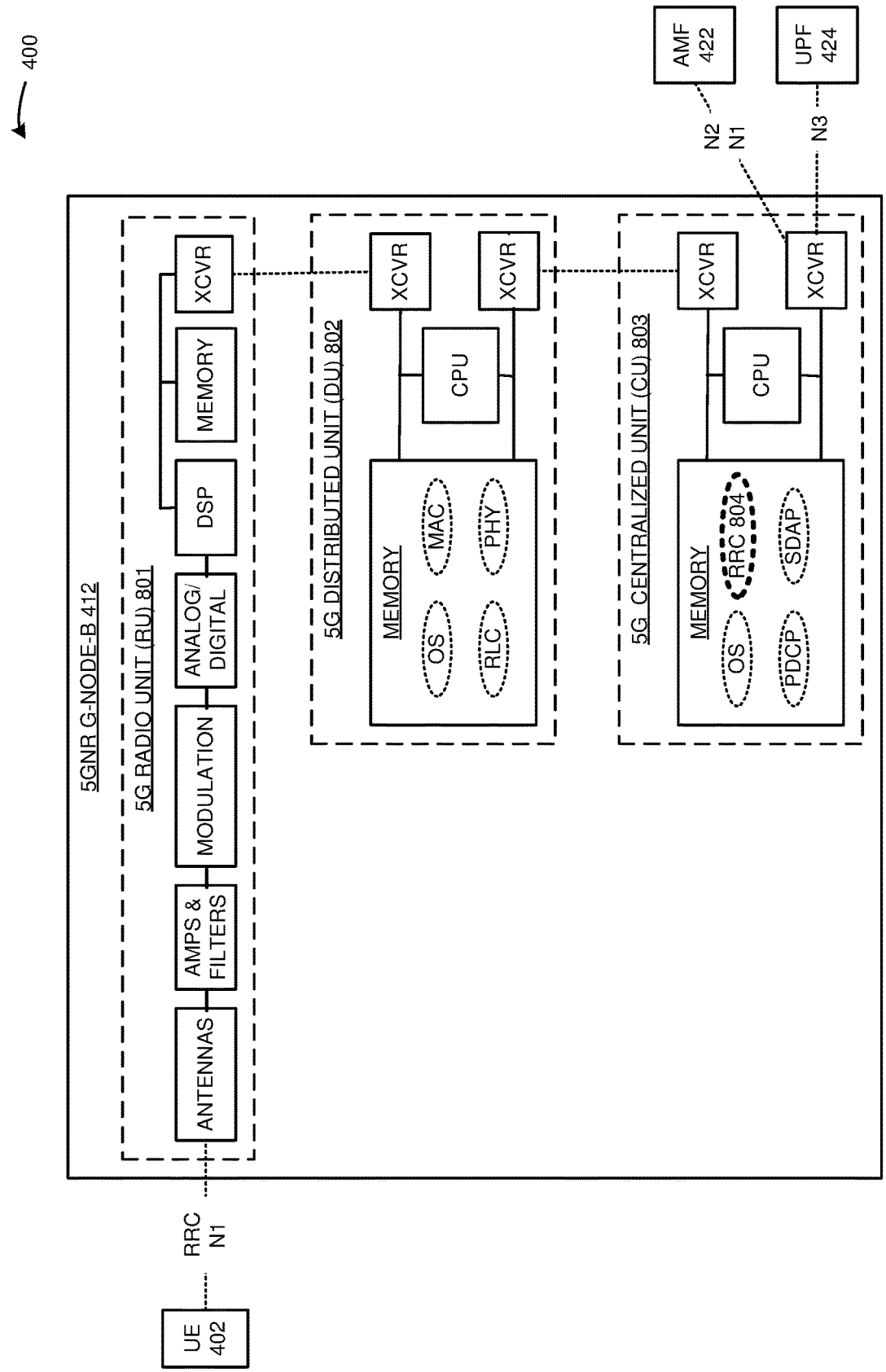
FIG. 8 illustrates a 5G New Radio (5GNR) gNodeB in the 5G communication network.

FIG. 8 illustrates 3GPP 5G New Radio (5GNR) gNodeB 412 in 5G communication network 400. 5GNR gNodeB 412 comprises an example of 3GPP access node 112, although access node 112 may differ from this example. 5GNR gNodeB 412 comprises 5G Radio Unit (RU) 801, 5G Distributed Unit (DU) 802, and 5G Centralized Unit (CU) 803. RU 801 comprises antennas, amplifiers, filters, modulation, analog-to-digital interfaces, DSP, memory, and transceivers that are coupled over bus circuitry. DU 802 comprises memory, CPU, and transceivers that are coupled over bus circuitry. The memory in DU 802 stores operating systems and 5GNR network applications like PHY, MAC, and RLC. CU 803 comprises memory, CPU, and transceivers that are coupled over bus circuitry. The memory in CU 803 stores an operating system and 5GNR network applications like Packet Data Convergence Protocol (PDCP), Service Data Adaptation Protocol (SDAP), and Radio Resource Control (RRC) 804.

The antennas in RU 801 are wirelessly coupled to UE 402 over 5GNR links that support RRC and N1. Transceivers in RU 801 are coupled to transceivers in DU 802 over fronthaul links like enhanced Common Public Radio Interface (eC-PRI). Transceivers in DU 802 are coupled to transceivers in CU 803 over mid-haul links. Transceivers in CU 803 are coupled to 5GC AMF 422 and 5GC UPF 424 over backhaul links. The CPU in DU 803 executes an operating system, PHY, MAC, and RLC to exchange 5GNR data units with RU 801 and to exchange 5GNR data units with CU 803. The CPU in CU 803 executes an operating system, PDCP, SDAP, and RRC 804 to exchange 5GC N2/N1 signaling and N3 data with 5GC AMF 422 and 5GC UPF 424.

UE 402 attaches to 5GNR RRC 804 in CU 803 and establishes the RRC. UE 402 registers with 5GC AMF 422 over the RRC, RRC 804, and N2. UE 402 and 5GC AMF 422 establish the N1 over the RRC, RRC 804, and N2. 5GC AMF 422 signals RRC 804 over the N2 to serve UE 402 over an N3 between the SDAP in CU 803 and 5GC UPF 424. UE 402 and the SDAP in CU 803 exchange user data over the RRC. The SDAP in CU 803 and 5GC UPF 424 exchange the user data over the N3. 5GC AMF 422 may transfer UE messages from WIFI/ENET access node 411 to UE 402 over the N1 that traverses the N2, RRC 804, and RRC. UE 402 may transfer UE messages to WIFI/ENET access node 411 over the reciprocal pathway.

In some examples, RRC 804 generates X2 data for WIFI/ENET access node 411. The X2 data comprises node status, handover information, UE data, and the like. RRC 804 transfers its X2 data to 5GC AMF 422 over N2. 5GC AMF 422 transfers the X2 data to non-3GPP IWF 421 over the N2. Non-3GPP IWF 421 transfers the X2 data to 3GPP 704 in WIFI/ENET access node 411 over the NXu.

Figure 9:
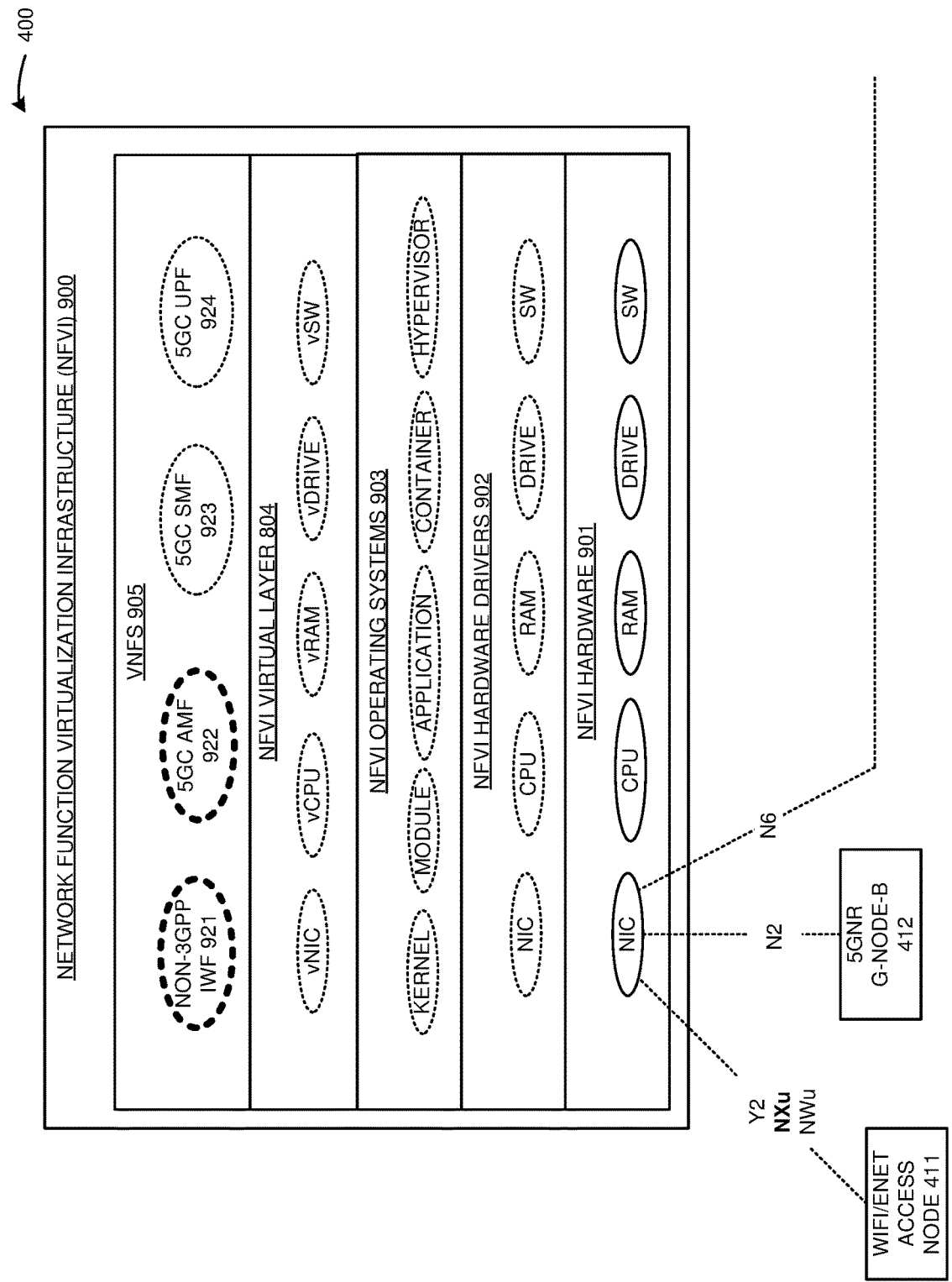
FIG. 9 illustrates a Network Function Virtualization Infrastructure (NFVI) in the 5G communication network.

FIG. 9 illustrates Network Function Virtualization Infrastructure (NFVI) 900 in 5G communication network 400. NFVI 900 comprises an example of network functions 121-124 that are depicted on FIG. 1, although network functions 121-124 may vary from this example. Network Function Virtualization Infrastructure (NFVI) comprises hardware 901, NFVI hardware drivers 902, NFVI operating systems 903, NFVI virtual layer 904, and NFVI Virtual Network Functions (VNFs) 905. NFVI hardware 901 comprises Network Interface Cards (NICs), CPU, RAM, Flash/Disk Drives (DRIVE), and Data Switches (SW). NFVI hardware drivers 902 comprise software that is resident in the NIC, CPU, RAM, DRIVE, and SW. NFVI operating systems 903 comprise kernels, modules, applications, containers, hypervisors, and the like. NFVI virtual layer 904 comprises vNIC, vCPU, vRAM, vDRIVE, and vSW. NFVI VNFs 905 comprise non-3GPP IWF 921, 5GC AMF 922, 5GC SMF 923, and 5GC UPF 924. Other VNFs like Authentication Server Function (AUSF) and Network Repository Function (NRF) are typically present but are omitted for clarity. NFVI 900 may be located at a single site or be distributed across multiple geographic locations. The NIC in NFVI hardware 901 are coupled to WIFI/ENET access node 411, 5GNR gNodeB 412, and external systems.

Figure 10:
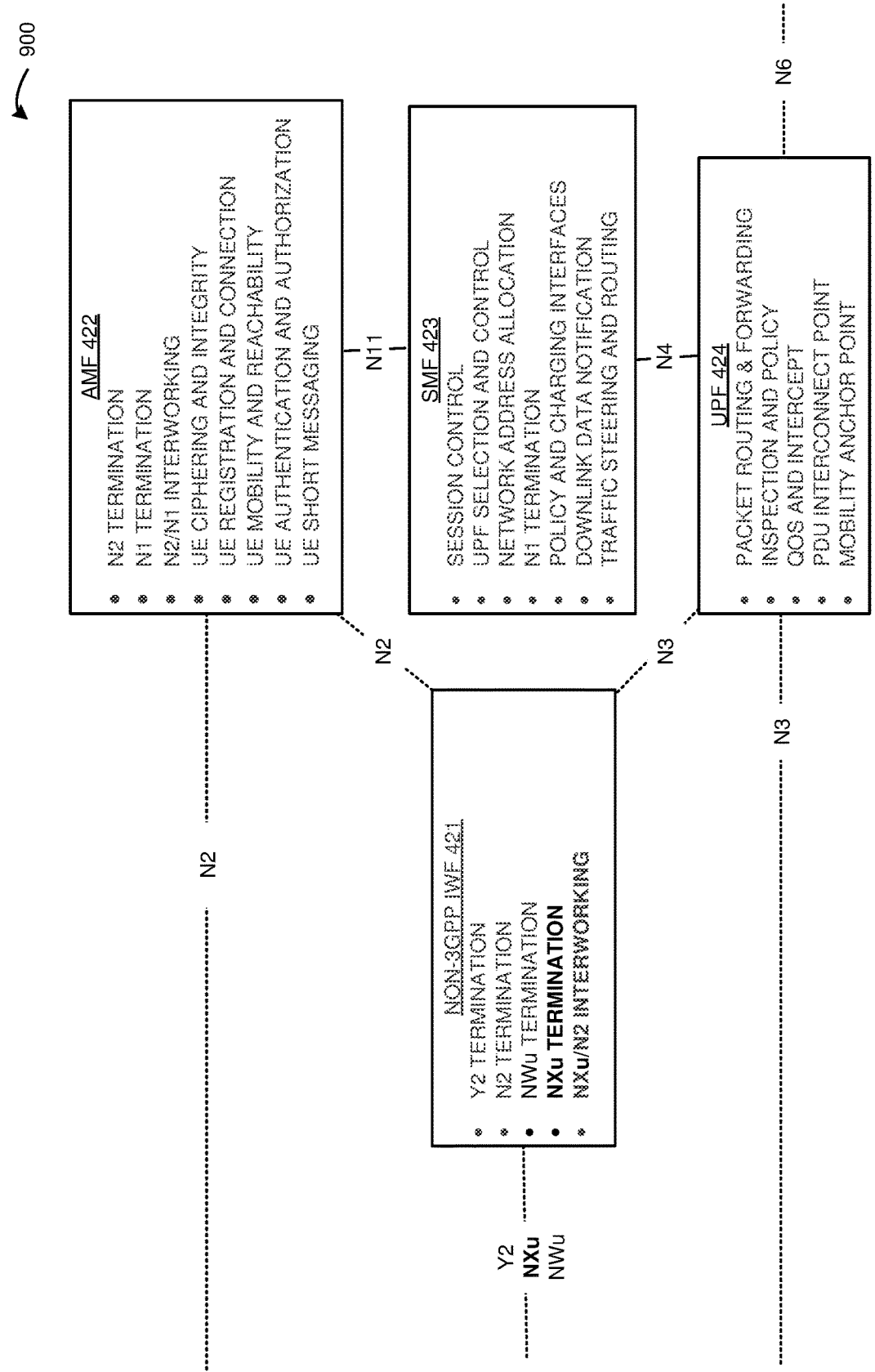
FIG. 10 further illustrates the NFVI in the 5G communication network.

NFVI hardware 901 executes NFVI hardware drivers 902, NFVI operating systems 903, NFVI virtual layer 904, and NFVI VNFs 905 to form 3GPP IWF 421, 5GC AMF 422, 5GC SMF 423, and 5GC UPF 424 which serve UEs 401-402. Referring to FIG. 10, non-3GPP IWF 421 performs Y2 termination, N2 termination, NWu termination, NXu termination, and NXu/N2 interworking. AMF 422 performs N2 termination, N1 termination, N2/N1 interworking, UE ciphering & integrity protection, UE registration and connection, UE connection/mobility management, UE authentication and authorization, and UE short messaging. SMF 423 performs session establishment/management, network address allocation, N1 termination, downlink data notification, and traffic steering and routing. UPF 424 performs packet routing & forwarding, packet inspection, QoS handling, PDU interconnection, and mobility anchoring.

WIFI/ENET access node 411 and 5GNR gNodeB 412 exchange X2 signaling over the NXu and N2— where the N2 traverses 5GC AMF 422. WIFI/ENET access node 411 and 5GC AMF 421 exchange N2 signaling over the NXu and N2— where the N2 traverses non-3GPP IWF 421.

UE 401 registers with non-3GPP IWF 421 over the Y1, WIFI/ENET access node 411, and Y2 to establish the NWu. UE 401 registers with 5GC AMF 422 over the NWu and N2 that traverse WIFI/ENET access node 411 and non-3GPP IWF 421. UE 401 and 5GC AMF 422 establish an N1 over the N2 and NWu where the NWu traverses non-3GPP IWF 421 and WIFI/ENET access node 411. 5GC AMF 422 signals non-3GPP IWF 421 over the N2 to serve UE 401 over the N3 between non-3GPP IWF 421 and 5GC UPF 424. 5GC AMF 422 signals 5GC SMF 423 over the N11 to serve UE 401 over the N3 between non-3GPP IWF 421 and 5GC UPF 424. 5GC SMF 423 signals 5GC UPF 424 over the N4 to serve UE 401 over the N6 and over the N3 between non-3GPP IWF 421 and 5GC UPF 424. 5GC AMF 422 signals UE 401 over the N1 use the bearer over the NWu, N3, and N6 which traverse WIFI/ENET access node 411, non-3GPP IWF 421, and 5GC UPF 424. UE 401 and non-3GPP IWF 421 exchange user data over the NWu that traverses WIFI/ENET access node 411. Non-3GPP IWF 421 and 5GC UPF 424 exchange the user data over the N3. 5GC UPF 424 exchanges the user data with external systems over the N6.

UE 402 registers with 5GC AMF 422 over the RRC, 5GNR gNodeB 412, and N2. UE 402 and 5GC AMF 422 establish an N1 over the RRC, 5GNR gNodeB 412, and N2. 5GC AMF 422 signals 5GNR gNodeB 412 over the N2 to serve UE 402 over an N3 between 5GNR gNodeB 412 and UPF 424. 5GC AMF 422 signals 5GC SMF 423 over the N11 to serve UE 402 over the N3 between 5GNR gNodeB 412 and 5GC UPF 424. 5GC SMF 423 signals 5GC UPF 424 over the N4 to serve UE 402 over the N3 between 5GNR gNodeB 412 and 5GC UPF 424. 5GNR gNodeB 412 signals UE 402 to communicate over the bearer that traverses 5GNR gNodeB 412 and UPF 424. UE 402 and 5GC UPF 424 exchange user data over the RRC, 5GNR gNodeB 412, and N3. 5GC UPF 424 exchanges the user data with external systems over the N6.

UE 402 also registers with non-3GPP IWF 421 over the Y1 and WIFI/ENET access node 411. UE 402 and non-3GPP IWF 421 establish an NWu over the Y1, WIFI/ENET access node 411, and Y2. UE 402 registers with 5GC AMF 422 to establish an N1 over the NWu and N2 which traverse WIFI/ENET access node 411 and non-3GPP IWF 421. 5GC AMF 422 signals non-3GPP IWF 421 over the N2 to serve UE 402 over the N3 between non-3GPP IWF 421 and 5GC UPF 424. 5GC AMF 422 signals 5GC SMF 423 over the N11 to serve UE 402 over the N3 between non-3GPP IWF 421 and 5GC UPF 424. 5GC SMF 123 signals 5GC UPF 124 over the N4 to serve UE 402 over the N6 and over the N3 between non-3GPP IWF 421 and 5GC UPF 424. 5GC AMF 422 signals UE 402 over the N1 use the bearer over the NWu, N3, and N6 that traverse WIFI/ENET access node 411, non-3GPP IWF 421, and 5GC UPF 424. UE 402 and non-3GPP IWF 421 exchange the user data over the NWu that traverses WIFI/ENET access node 411. Non-3GPP IWF 421 and 5GC UPF 424 exchange the user data over the N3. 5GC UPF 424 exchanges the user data with external systems over the N6.

5GC AMF 422 detects conditions like UE access control, emergency information, user content, or some other information for UE 401. 5GC AMF 422 transfers condition information to non-3GPP IWF 421 over the N2. Non-3GPP IWF 421 transfers the condition information to WIFI/ENET access node 411 over the NXu. WIFI/ENET access node 411 processes the condition information to generate UE messages like an access class back-off, amber alert, user short message, or some other information for UEs 401-402. WIFI/ENET access node 411 transfers UE messages for UEs 401-402 to non-3GPP IWF 421 over the NXu. Non-3GPP IWF 421 transfers the UE messages to 5GC AMF 422 over the N2. 5GC AMF 422 may transfer UE messages to UE 401 over the N1 that traverses the N2 and NWu which traverse non-3GPP IWF 421 and WIFI/ENET access node 411. 5GC AMF 422 may transfers UE messages to UE 402 over the N1 that traverses the N2 and RRC which traverse 5GNR gNodeB 412. UEs 401-402 may transfer messages to WIFI/ENET access node 411 over the reciprocal pathways.

Figure 11:
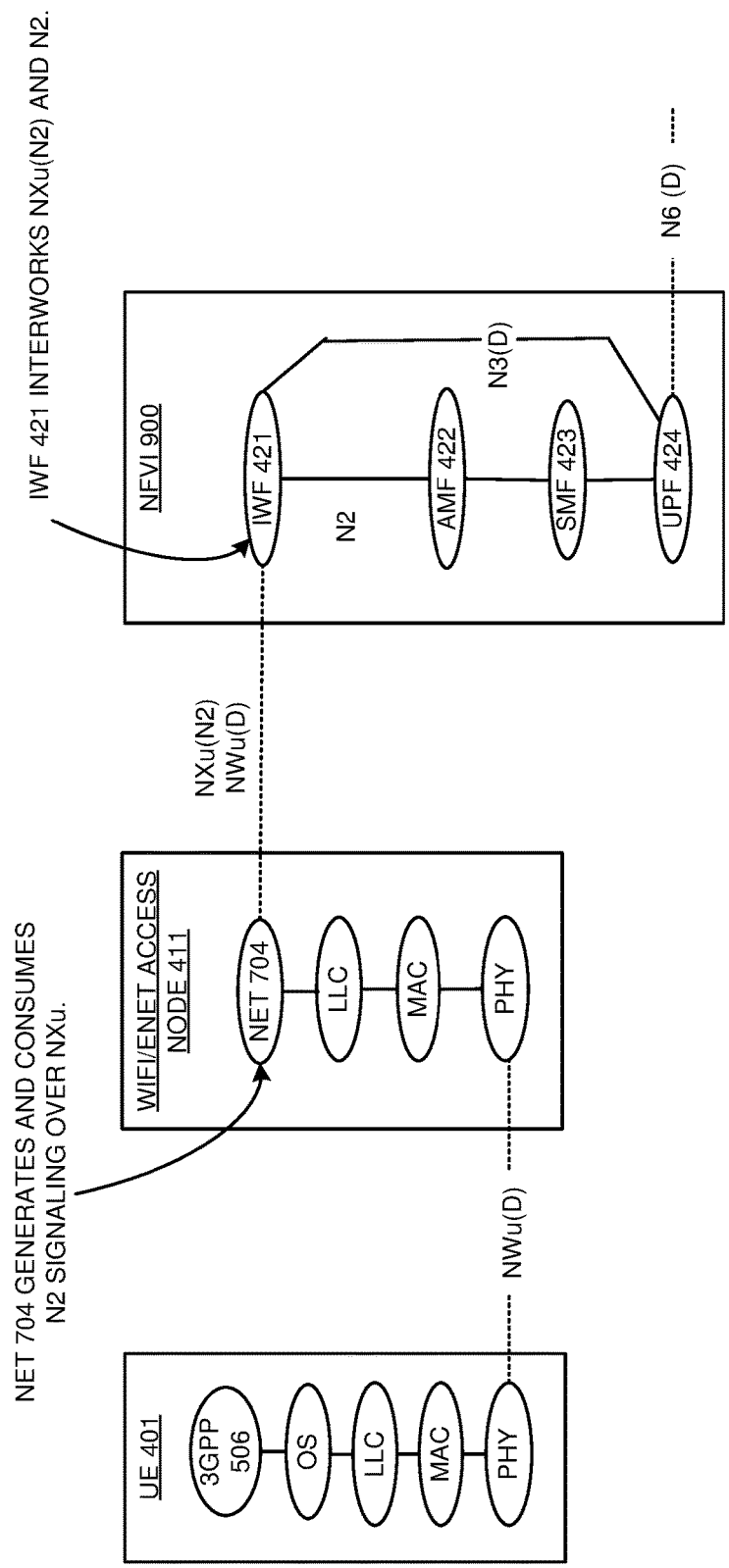
FIG. 11 illustrates an operation of the 5G communication network to exchange N2 signaling between a 5G Core (5GC) Access and Mobility Management Function (AMF) and the WIFI/ENET access node over the non-3GPP IWF.

FIG. 11 illustrates an operation of 5G communication network 400 to exchange N2 signaling between 5GC AMF 422 and non-3GPP WIFI/ENET access node 411. The operation may vary in other examples. The WIFI LLC in UE 401 attaches to the WIFI LLC in WIFI/ENET access node 411 over the Y1. 3GPP 506 in UE 401 registers with non-3GPP IWF 421 over the Y1, WIFI/ENET access node 411, and Y2. 3GPP 506 and non-3GPP IWF 421 establish an NWu over WIFI/ENET access node 411. 3GPP 506 registers with 5GC AMF 422 over the NWu and N2 that traverse WIFI/ENET access node 411 and non-3GPP IWF 421. 3GPP 506 and 5GC AMF 422 establish an N1 over the NWu and N2 that traverse WIFI/ENET access node 411 and non-3GPP IWF 421. 5GC AMF 422 signals non-3GPP IWF 421 over the N2 to serve UE 401 over the N3 between non-3GPP IWF 421 and 5GC UPF 424. 5GC AMF 422 signals 5GC SMF 423 over the N11 to serve UE 401 over the N3 between non-3GPP IWF 421 and 5GC UPF 424. 5GC SMF 423 signals 5GC UPF 424 over the N4 to serve UE 401 over the N6 and over the N3 between non-3GPP IWF 421 and 5GC UPF 424. 5GC AMF 422 signals 5GC SMF 423 over the N11 to serve UE 401 over the N3 between non-3GPP IWF 421 and 5GC UPF 424. 5GC SMF 423 signals 5GC UPF 424 over the N4 to serve UE 401 over the N6 and over the N3 between non-3GPP. 5GC AMF 422 signals UE 401 over the N1 to use the bearer that traverses the NWu, N3, and N6 which traverse WIFI/ENET access node 411, non-3GPP IWF 421, and 5GC UPF 424.

3GPP 506 in UE 401 and non-3GPP IWF 412 exchange user data (D) over the NWu that traverses NET 704 in WIFI/ENET access node 411. Non-3GPP IWF 421 and 5GC UPF 424 exchange the user data over the N3. 5GC UPF 424 exchanges the user data with external systems over the N6.

5GC AMF 422 detects a condition and transfers condition information to NET 704 over N2, non-3GPP IWF 421, and NXu. Thus, non-3GPP IWF 421 interworks between the N2 and the NXu that carries the N2 data. NET 704 processes the condition information to generate UE messages like Non-Access Stratum (NAS) files.

Figure 12:
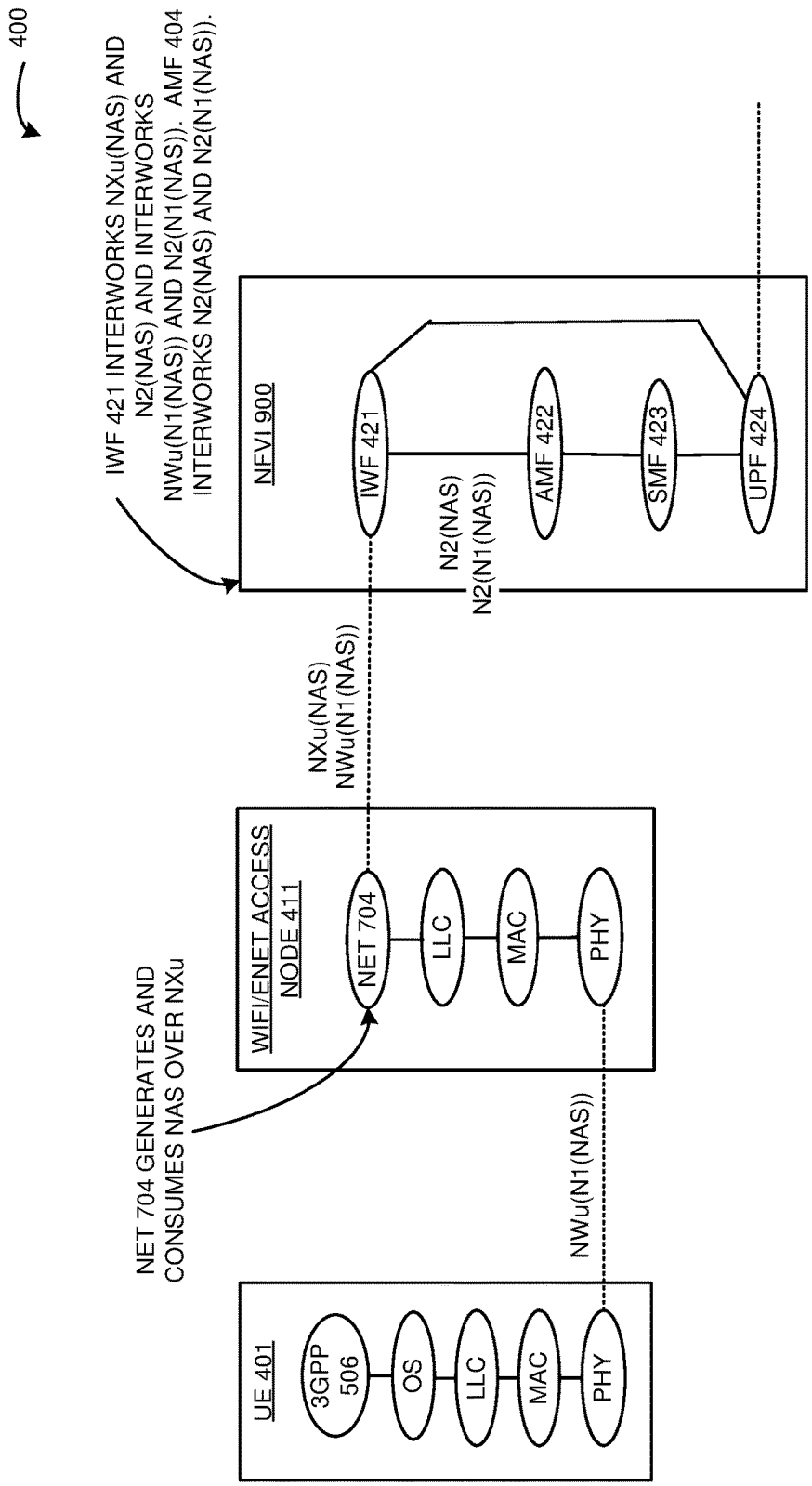
FIG. 12 illustrates an operation of the 5G communication network to exchange Non-Access Stratum (NAS) data between the WIFI/ENET UE and the WIFI/ENET access node over the non-3GPP IWF, 5GC AMF, and WIFI/ENET access node.

FIG. 12 illustrates an operation of 5G communication network 400 to exchange Non-Access Stratum (NAS) data between non-3GPP UE 401 and non-3GPP WIFI/ENET access node 411 over non-3GPP IWF 421, 5GC AMF 422, and WIFI/ENET access node 411. The operation may vary in other examples. In WIFI/ENET access node 411, NET 704 generates a NAS file (NAS) for UE 401. The NAS could specify access control, emergency information, node status, user content, or some other information for UE 401. In some cases, 5GC AMF 422 transfers N2 signaling to NET 704 over the NXu, and NET 704 processes the N2 signaling to generate the NAS. NET 704 transfers the NAS to non-3GPP IWF 421 over the NXu. Non-3GPP IWF 421 transfers the NAS to 5GC AMF 422 over the N2. 5GC AMF 422 transfers NAS to 3GPP 506 in UE 401 over the N1 that traverses the N2 and NWu which traverse non-3GPP IWF 421 and WIFI/ENET access node 411. NET 704 generates and consumes NAS over NXu. Non-3GPP IWF 421 interworks between NXu(NAS) and N2(NAS) and between N2(NAS) and NWu(NAS). 5GC AMF 422 interworks between N2(NAS) and N2(N1(NAS)). 3GPP 506 in UE 401 processes the NAS. 3GPP 506 in UE 401 may transfer NAS to NET 704 in access node 411 over the reciprocal pathway.

Figure 13:
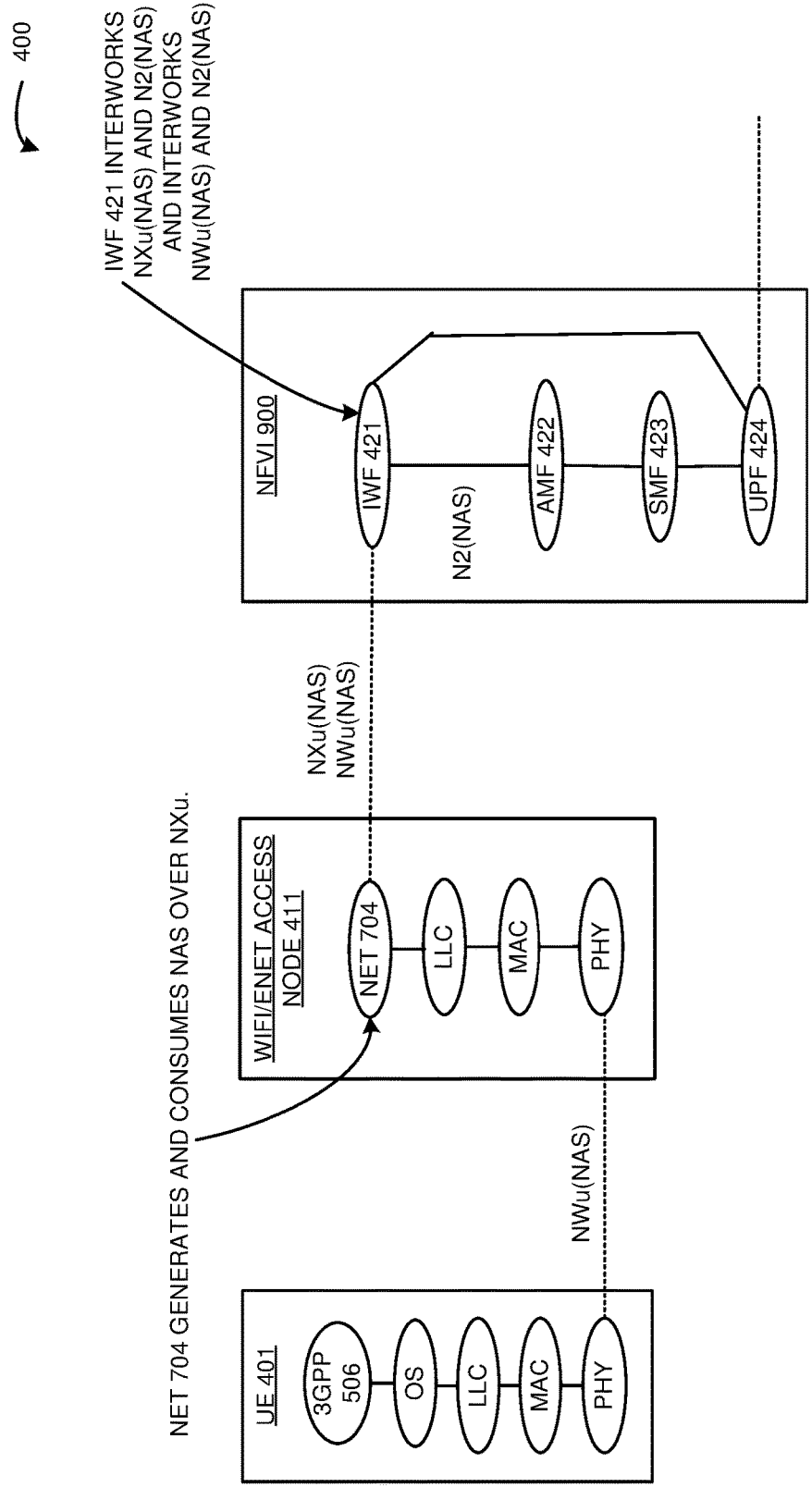
FIG. 13 illustrates an operation of the 5G communication network to exchange NAS data between the WIFI/ENET UE and the WIFI/ENET access node over the non-3GPP IWF, 5GC AMF, and WIFI/ENET access node.

FIG. 13 illustrates an operation of 5G communication network 400 to exchange NAS data between non-3GPP UE 401 and non-3GPP WIFI/ENET access node 411 over non-3GPP IWF 421, 5GC AMF 421, and non-3GPP WIFI/ENET access node 411. The operation may vary in other examples. In WIFI/ENET access node 411, NET 704 generates NAS for UE 401. The NAS could specify access control, emergency information, node status, user content, or some other information for UE 401. In some cases, 5GC AMF 422 transfers N2 signaling to NET 704 over NXu, and NET 704 processes the information to generate the NAS. NET 704 transfers the NAS to non-3GPP IWF 421 over NXu. Non-3GPP IWF 421 transfers the NAS to 5GC AMF 422 over N2. 5GC AMF 422 transfers the NAS back to non-3GPP IWF 421 over N2. Non-3GPP IWF 421 transfers the NAS to UE 401 over the NWu that traverses WIFI/ENET access node 411. Thus, NET 704 generates and consumes NAS over NXu. Non-3GPP IWF 421 interworks between NXu (NAS) and N2(NAS). 3GPP 506 in UE 401 processes the NAS. 3GPP 506 in UE 401 may transfer NAS to NET 704 over the reciprocal pathway.

Figure 14:
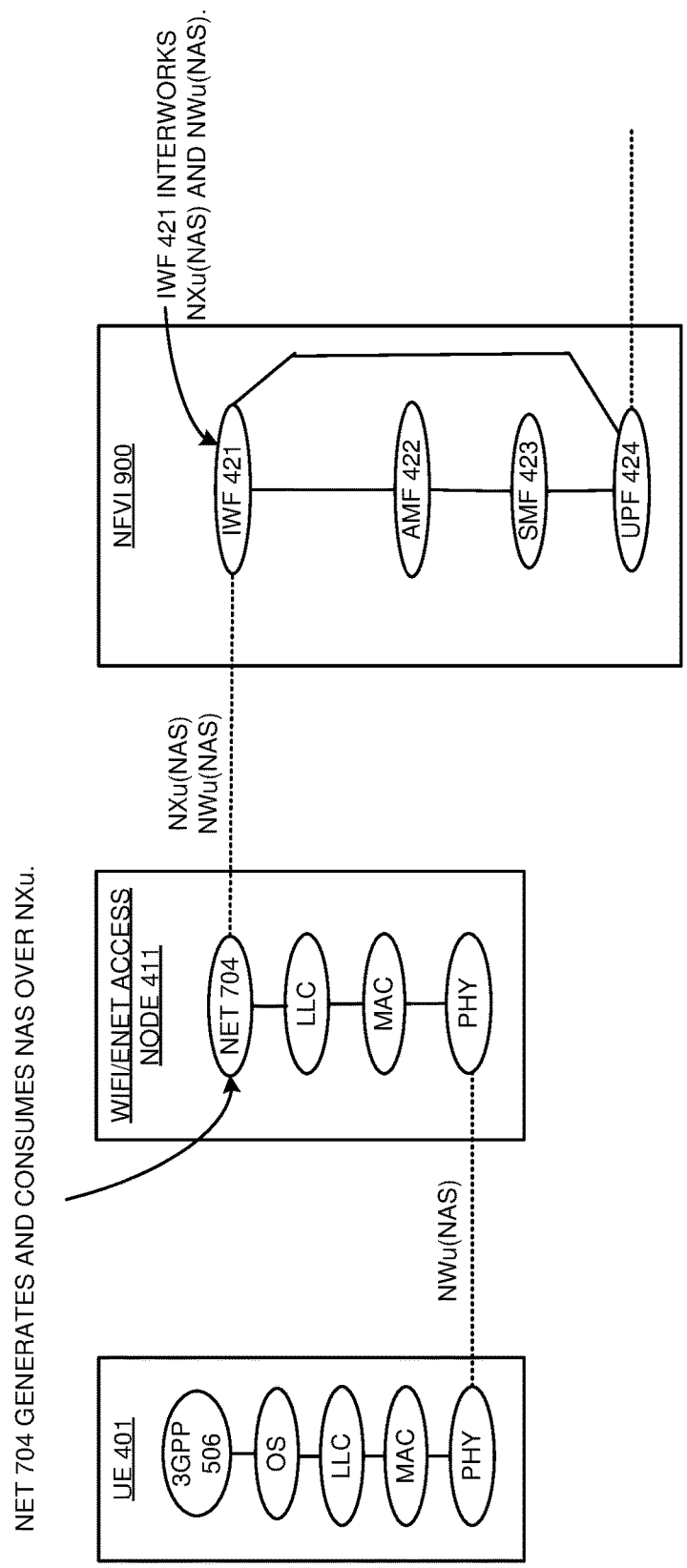
FIG. 14 illustrates an operation of the 5G communication network to exchange NAS data between the WIFI/ENET UE and the WIFI/ENET access node over the non-3GPP IWF and WIFI/ENET access node.

FIG. 14 illustrates an operation of 5G communication network 400 to exchange NAS data between non-3GPP UE 401 and non-3GPP WIFI/ENET access node 411 over non-3GPP IWF 421 and non-3GPP WIFI/ENET access node 411. The operation may vary in other examples. In WIFI/ENET access node 411, 3GPP network application 704 generates NAS for UE 401. The NAS could specify access control, emergency information, node status, user content, or some other information for UE 401. In some cases, 5GC AMF 422 transfers N2 signaling to NET 704 over NXu, and NET 704 processes the signaling to generate the NAS. NET 704 transfers the NAS to non-3GPP IWF 421 over NXu. Non-3GPP IWF 421 transfers the NAS to 3GPP 506 in UE 401 over the NWu that traverses WIFI/ENET access node 411. Thus, NET 704 generates and consumes NAS over NXu. Non-3GPP IWF 421 interworks between NXu(NAS) and NWu(NAS). 3GPP 506 in UE 401 processes the NAS. 3GPP 506 in UE 401 may transfer NAS to 3GPP 704 over the reciprocal pathway.

Figure 15:
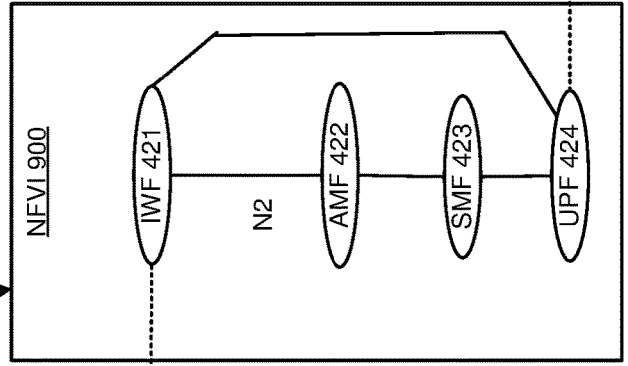
FIG. 15 illustrates an operation of the 5G communication network to exchange NAS data between the WIFI/ENET UE and the WIFI/ENET access node over the non-3GPP IWF, 5GC AMF, and WIFI/ENET access node.
Figure 15:
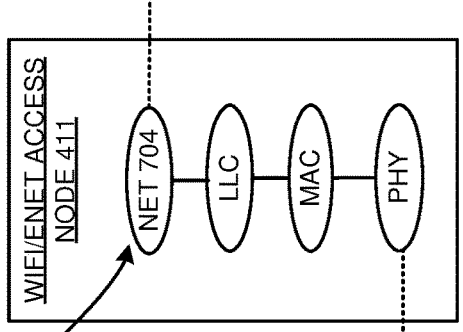
Figure 15:
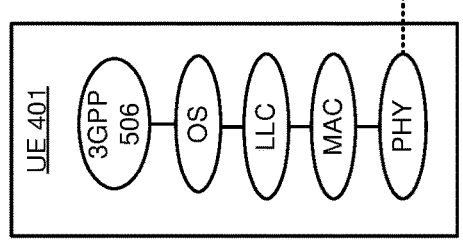

FIG. 15 illustrates an operation of 5G communication network 400 to exchange NAS data between non-3GPP UE 401 and non-3GPP WIFI/ENET access node 411. The operation may vary in other examples. In WIFI/ENET access node 411, NET 704 generates and consumes open N2 data. The open N2 data specifies public information for access, emergencies, status, and the like. NET 704 exchanges the open N2 data with non-3GPP IWF 421 over Y2. Non-3GPP IWF 421 exchanges the open N2 data with 5GC AMF 422 over N2. Thus, non-3GPP IWF 421 interworks open N2 data between Y2 and N2. In WIFI/ENET access node 411, NET 704 generates and consumes open NAS. The open NAS specifies public information for access, emergencies, status, and the like. NET 704 exchanges the open NAS with 3GPP 506 in UE 401 over the Y1. 3GPP 506 in UE 401 processes the open NAS.

Figure 16:
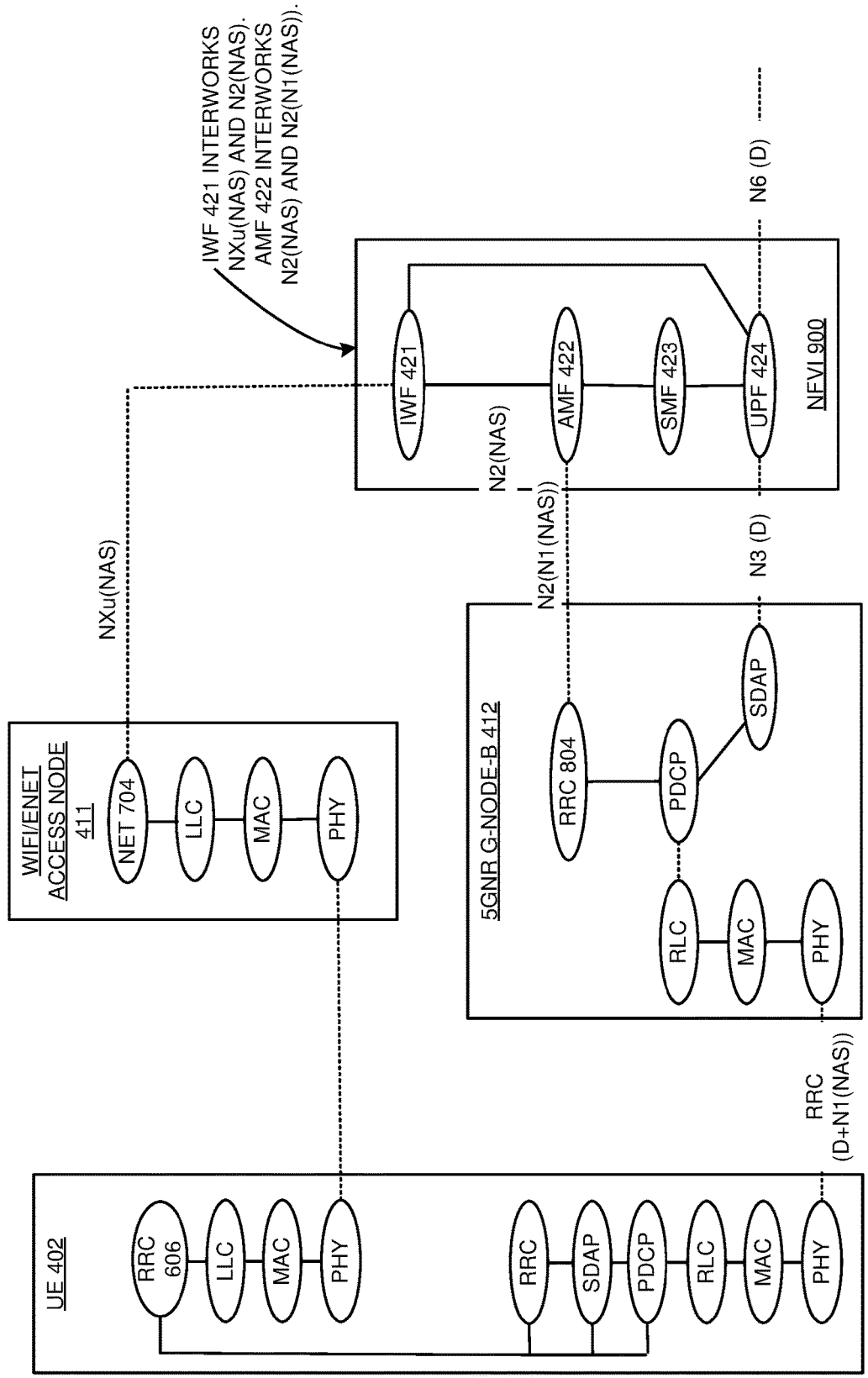
FIG. 16 illustrates an operation of the 5G communication network to exchange NAS data between the 5GNR/WIFI/ENET UE and the WIFI/ENET access node over the non-3GPP IWF, 5GC AMF, and 5GNR gNodeB.

FIG. 16 illustrates an operation of 5G communication network 400 to exchange NAS data between 3GPP UE 402 and non-3GPP WIFI/ENET access node 411 over the non-3GPP IWF 421, 5GC AMF 422, and 5GNR gNodeB 412. The operation may vary in other examples. Note that the operations described above for UE 401 in FIGS. 11-15 could also be performed for UE 402. Additional operations for UE 402 over 5GNR gNodeB 412 are described below. RRC 606 in UE 402 attaches to RRC 804 in 5GNR gNodeB 412 and establishes an RRC connection. RRC 606 in UE 402 registers with 5GC AMF 422 over the RRC, RRC 804, and N2. RRC 606 and 5GC AMF 422 establish an N1 over the RRC, RRC 804, and N2. 5GC AMF 422 signals RRC 804 over the N2 to serve UE 402 over an N3 between the SDAP in 5GNR gNodeB 412 and 3GPP UPF 424. 5GC AMF 422 signals 5GC SMF 423 over the N11 to serve UE 402 over the N3 between the SDAP in 5GNR gNodeB 412 and 5GC UPF 424. 5GC SMF 423 signals 5GC UPF 424 over the N4 to serve UE 402 over the N3 between 5GNR gNodeB 412 and 5GC UPF 424. The SDAP in UE 402 and the SDAP in 5GNR gNodeB 412 exchange user data over the RRC connection. The SDAP in 5GNR gNodeB 412 and 5GC UPF 424 exchange the user data over the N3. 5GC UPF 424 exchanges the user data with external systems over the N6.

In WIFI/ENET access node 411, NET 704 generates NAS for RRC 606 in UE 402. The NAS could specify access control, emergency information, node status, user content, or some other information for UE 401. In some cases, 5GC AMF 422 transfers N2 signaling to NET 704 over NXu, and NET 704 processes the information to generate the NAS. NET 704 transfers the NAS to non-3GPP IWF 421 over the NXu. Non-3GPP IWF 421 transfers the NAS to 5GC AMF 422 over the N2. 5GC AMF 422 transfers NAS to RRC 606 in UE 401 over the N1 that traverses the N2, RRC 804, and RRC. Thus, non-3GPP IWF 421 interworks between NXu (NAS) and N2(NAS). 5GC AMF 422 interworks between N2(NAS) and N2(N1(NAS)). RRC 606 in UE 401 processes the NAS. RRC 606 in UE 401 may transfer NAS to NET 704 in access node 411 over the reciprocal pathway. AMF 422 may also use the pathways over non-3GPP IWF 421 and WIFI/ENET access node 411 to exchange NAS with UE 402.

Figure 17:
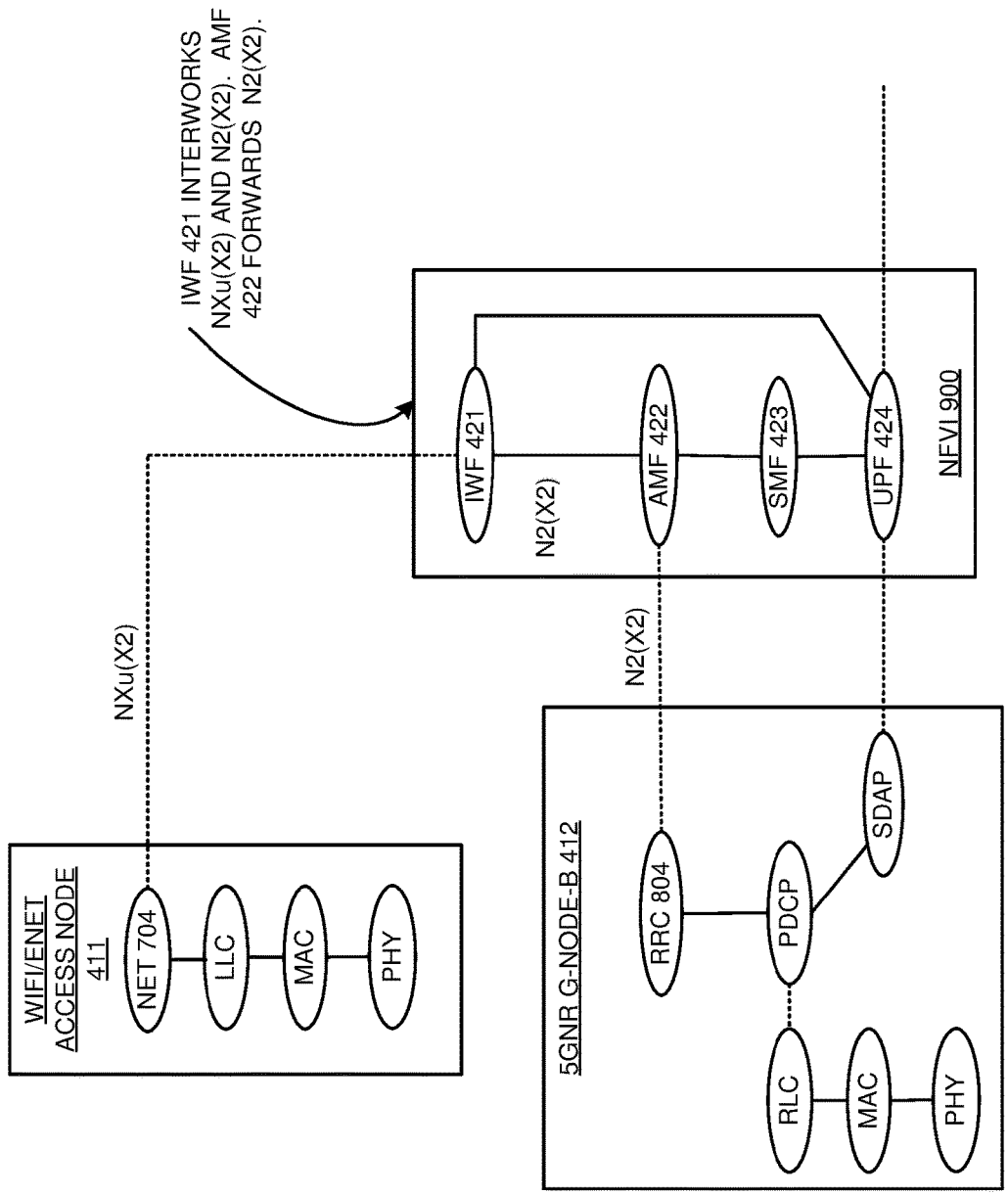
FIG. 17 illustrates an operation of the 5G communication network to exchange X2 signaling between the WIFI/ENET access node and the 5GNR gNodeB over the non-3GPP IWF and 5GC AMF.

FIG. 17 illustrates an operation of 5G communication network 400 to exchange X2 signaling between non-3GPP WIFI/ENET access node 411 and 3GPP 5GNR gNodeB 412 over non-3GPP IWF 421 and 5GC AMF 422. The operation may vary in other examples. In WIFI/ENET access node 411, NET 704 generates X2 data for RRC 804 in 5GNR gNodeB 412. In 5GNR gNodeB 412, RRC 804 generates X2 data for NET 704 in WIFI/ENET access node 411. The X2 data comprises node status, handover information, UE data, and the like. NET 704 transfers its X2 data to non-3GPP IWF 421 over the NXu. Non-3GPP IWF 421 transfers the X2 data to 5GC AMF 422 over the N2. 5GC AMF 422 transfers the X2 data to RRC 804 in 5GNR gNodeB 412 over the N2. RRC 804 in 5GNR gNodeB 412 transfers its X2 data to 5GC AMF 422 over the N2. 5GC AMF 422 transfers the X2 data to non-3GPP IWF 421 over the N2. Non-3GPP IWF 421 transfers the X2 data from RRC 804 to NET 704 in WIFI/ENET access node 411 over the NXu. Thus, non-3GPP IWF 421 interworks between Y2(X2) and N2(X2). 5GC AMF 422 forwards X2 over N2.

The wireless data network circuitry described above comprises computer hardware and software that form special-purpose network circuitry to control UEs over non-3GPP access nodes using 3GPP signaling. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to control UEs over non-3GPP access nodes using 3GPP signaling.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to transfer a signaling message from a wireless access node to a wireless user device, the method comprising:
   establishing, by an Access and Mobility Management Function (AMF), a node signaling link with the wireless access node, wherein the node signaling link traverses a Non-Third Generation Partnership Project Interworking Function (N3IWF) and the wireless access node wirelessly exchanges user data with the wireless user device;
   establishing, by the AMF, a user signaling link with the wireless user device, wherein the user signaling link traverses the N3IWF and the wireless access node and wherein the wireless user device wirelessly exchanges the user data with the wireless access node;
   receiving, by the AMF, the signaling message from the wireless access node over the node signaling link; and
   transferring, by the AMF, the signaling message to the wireless user device over the user signaling link.

2. The method of claim 1 wherein:
   establishing, by the AMF, the node signaling link with the wireless access node comprises establishing, by the AMF, a Third Generation Partnership Project (3GPP) N2 signaling link that traverses the N3IWF with the wireless access node; and
   receiving, by the AMF, the signaling message from the wireless access node over the node signaling link comprises receiving, by the AMF, the signaling message from the wireless access node over the 3GPP N2 signaling link.

3. The method of claim 1 wherein:
   establishing, by the AMF, the user signaling link with the wireless user device comprises establishing, by the AMF, a Third Generation Partnership Project (3GPP) N1 signaling link that traverses the N3IWF and the wireless access node with the wireless user device; and
   transferring, by the AMF, the signaling message to the wireless user device over the user signaling link comprises transferring, by the AMF, the signaling message to the wireless user device over the 3GPP N1 signaling link.

4. The method of claim 1 wherein:
   establishing, by the AMF, the node signaling link with the wireless access node comprises, by the AMF, establishing the node signaling link with an Institute of Electrical and Electronic Engineers (IEEE) 802.11 (WIFI) access node; and
   receiving, by the AMF, the signaling message from the wireless access node over the node signaling link comprises receiving, by the AMF, the signaling message from the WIFI access node over the node signaling link.

5. The method of claim 1 wherein:
   establishing, by the AMF, the node signaling link with the wireless access node comprises establishing, by the AMF, the node signaling link with an Institute of Electrical and Electronic Engineers (IEEE) 802.3 (ETHERNET) access node; and
   receiving, by the AMF, the signaling message from the wireless access node over the node signaling link comprises receiving, by the AMF, the signaling message from the ETHERNET access node over the node signaling link.

6. The method of claim 1 wherein:
   receiving, by the AMF, the signaling message from the wireless access node over the node signaling link comprises receiving, by the AMF, status information for the wireless access node from the wireless access node over the node signaling link; and transferring, by the AMF, the signaling message to the wireless user device over the user signaling link comprises transferring, by the AMF, the status information for the wireless access node to the wireless user device over the user signaling link.

7. The method of claim 1 wherein:

receiving, by the AMF, the signaling message from the wireless access node over the node signaling link comprises receiving, by the AMF, emergency alert information from the wireless access node over the node signaling link; and transferring, by the AMF, the signaling message to the wireless user device over the user signaling link comprises transferring, by the AMF, the emergency alert information to the wireless user device over the user signaling link.

8. A method to transfer a signaling message from a wireless user device to a wireless access node, the method comprising:

establishing, by an Access and Mobility Management Function (AMF), a user signaling link with the wireless user device, wherein the user signaling link traverses a Non-Third Generation Partnership Project Interworking Function (N3IWF) and the wireless access node and wherein the wireless user device wirelessly exchanges user data with the wireless access node;

establishing, by the AMF, a node signaling link with the wireless access node, wherein the node signaling link traverses the N3IWF and the wireless access node wirelessly exchanges the user data with the wireless user device;

receiving, by the AMF, the signaling message from the wireless user device over the user signaling link; and transferring, by the AMF, the signaling message to the wireless access node over the node signaling link.

9. The method of claim 8 wherein:

establishing, by the AMF, the user signaling link with the wireless user device comprises establishing, by the AMF, a Third Generation Partnership Project (3GPP) N1 signaling link that traverses the N3IWF and the wireless access node with the wireless user device; and receiving, by the AMF, the signaling message from the wireless user device over the user signaling link comprises receiving, by the AMF, the signaling message from the wireless user device over the 3GPP N1 signaling link.

10. The method of claim 8 wherein:

establishing, by the AMF, the node signaling link with the wireless access node comprises establishing, by the AMF, a Third Generation Partnership Project (3GPP) N2 signaling link that traverses the N3IWF with the wireless access node; and transferring, by the AMF, the signaling message to the wireless access node over the node signaling link comprises transferring, by the AMF, the signaling message to the wireless access node over the 3GPP N2 signaling link.

11. The method of claim 8 wherein:

establishing, by the AMF, the node signaling link with the wireless access node comprises establishing, by the AMF, the node signaling link with an Institute of Electrical and Electronic Engineers (IEEE) 802.11 (WIFI) access node; and transferring, by the AMF, the signaling message to the wireless access node over the node signaling link comprises transferring, by the AMF, the signaling message to the WIFI access node over the node signaling link.

12. The method of claim 8 wherein:

establishing, by the AMF, the node signaling link with the wireless access node comprises establishing, by the AMF, the node signaling link with an Institute of Electrical and Electronic Engineers (IEEE) 802.3 (ETHERNET) access node; and transferring, by the AMF, the signaling message to the wireless access node over the node signaling link comprises transferring, by the AMF, the signaling message to the ETHERNET access node over the node signaling link.

13. The method of claim 8 wherein:

receiving, by the AMF, the signaling message from the wireless user device over the user signaling link comprises receiving, by the AMF, status information for the wireless user device from the wireless user device over the user signaling link; and transferring, by the AMF, the signaling message to the wireless access node over the node signaling link comprises transferring, by the AMF, the status information for the wireless user device to the wireless access node over the node signaling link.

14. The method of claim 8 wherein:

receiving, by the AMF, the signaling message from the wireless user device over the user signaling link comprises receiving, by the AMF, emergency alert information from the wireless user device over the user signaling link; and transferring, by the AME, the signaling message to the wireless access node over the node signaling link comprises transferring, by the AMF, the emergency alert information to the wireless access node over the node signaling link.

15. A wireless communication system to transfer signaling messages between an Institute of Electrical and Electronic Engineers (IEEE) 802.11 (WIFI) access node and a User Equipment (UE), the wireless communication system comprising:

a Non-Third Generation Partnership Project Interworking Function (N3IWF) configured to communicate with the WIFI access node and with an Access and Mobility Management Function (AMF);

the AMF configured to establish an N1 signaling that traverses the N3IWF and the WIFI access node with the UE;

the AMF further configured to receive one of the signaling messages from the WIFI access node over the N3IWF; and the AMF further configured to transfer the one of the signaling messages to the UE over the N1 signaling link that traverses the N3IWF and the WIFI access node.

16. The wireless communication system of claim 15 wherein:

the AMF is further configured to establish an N2 signaling link that traverses the N3IWF with the WIFI access node; and the AMF is further configured to receive the one of the signaling messages from the WIFI access node over the N2 signaling link that traverses the N3IWF.

17. The wireless communication system of claim 15 wherein the one of the signaling messages comprises status information for the WIFI access node.

18. The wireless communication system of claim 15 wherein:
- the AMF is further configured to receive another one of the signaling messages from the UE over the N1 signaling link that traverses the N3IWF and the WIFI access node; and
- the AMF is further configured to transfer the other one of the signaling messages to the WIFI access node over the N3IWF.

19. The wireless communication system of claim 18 wherein:
- the AMF is further configured to establish an N2 signaling link that traverses the N3IWF with the WIFI access node; and
- the AMF is further configured to transfer the other one of the signaling messages to the WIFI access node over the N2 signaling link that traverses the N3IWF.

20. The wireless communication system of claim 18 wherein the other one of the signaling messages comprises status information for the UE.

* * * * *